US012515848B2

(12) United States Patent
Inagawa et al.

(10) Patent No.: US 12,515,848 B2
(45) Date of Patent: *Jan. 6, 2026

(54) SHEET MATERIAL CONTAINER

(71) Applicant: Kao Corporation, Tokyo (JP)

(72) Inventors: Yoshinori Inagawa, Chiba (JP);
Mitsugu Iwatsubo, Tama (JP);
Takahiro Otsuka, Wakayama (JP);
Masahito Chiwaki, Yachiyo (JP);
Daisuke Kodama, Koto-ku (JP)

(73) Assignee: Kao Corporation, Tokyo (JP)

( * ) Notice: Subject to any disclaimer, the term of this patent is extended or adjusted under 35 U.S.C. 154(b) by 6 days.

This patent is subject to a terminal disclaimer.

(21) Appl. No.: 18/535,600

(22) Filed: Dec. 11, 2023

(65) Prior Publication Data

US 2024/0132253 A1    Apr. 25, 2024
US 2024/0228119 A9    Jul. 11, 2024

Related U.S. Application Data

(63) Continuation of application No. 17/366,852, filed on Jul. 2, 2021, now Pat. No. 11,878,841, which is a
(Continued)

(30) Foreign Application Priority Data

Sep. 9, 2015 (WO) .................. PCT/JP2015/075582

(51) Int. Cl.
*B65D 33/02* (2006.01)
*B65D 30/08* (2006.01)
(Continued)

(52) U.S. Cl.
CPC .......... *B65D 31/145* (2013.01); *B65D 31/02* (2013.01); *B65D 33/02* (2013.01); *B65D 37/00* (2013.01);
(Continued)

(58) Field of Classification Search
CPC ...... B65D 31/145; B65D 31/02; B65D 33/02; B65D 37/00; B65D 75/008; B65D 75/5855
(Continued)

(56) References Cited

U.S. PATENT DOCUMENTS 4,573,202 A    2/1986  Lee
5,059,036 A   10/1991  Richison
(Continued)

FOREIGN PATENT DOCUMENTS

CN    2728206 Y     9/2005
CN  101443056 A     5/2009
(Continued)

OTHER PUBLICATIONS

Extended European Search Report issued on Feb. 27, 2019 in European Patent Application No. 16844459.4, 7 pages.
(Continued)

*Primary Examiner* — Peter N Helvey
(74) *Attorney, Agent, or Firm* — Oblon, McClelland, Maier & Neustadt, L.L.P.

(57) ABSTRACT

The present invention provides a sheet material container being made of a sheet material and including a body portion and a bottom portion that is to be disposed on a placement surface, and the sheet material including a plurality of film layers. A body portion sheet that constitutes the body portion includes a bonding portion where peripheral edge portions of the sheet materials are bonded. In a bottom surface sheet that constitutes the bottom portion, a non-adhesive region is provided in the plurality of film layers. The non-adhesive region forms a bottom filler-filled portion. The bottom filler-filled portion extends annularly around a non-filled portion, and includes at least three protruding leg portions that are to be placed on the placement surface so as to allow (Continued)

the container to stand by itself. The protruding leg portions protrude toward the placement surface past other portions in the bottom filler-filled portion due a leg forming portion.

16 Claims, 27 Drawing Sheets

Related U.S. Application Data continuation of application No. 15/758,654, filed as application No. PCT/JP2016/076507 on Sep. 8, 2016, now Pat. No. 11,059,626.

(51) Int. Cl.
*B65D 30/24* (2006.01)
*B65D 37/00* (2006.01)
*B65D 75/00* (2006.01)
*B65D 75/58* (2006.01)

(52) U.S. Cl.
CPC ....... *B65D 75/008* (2013.01); *B65D 75/5822* (2013.01)

(58) Field of Classification Search
USPC ...................................... 229/112.32
See application file for complete search history.

(56) References Cited

U.S. PATENT DOCUMENTS

| | | | |
|---|---|---|---|
| 5,788,121 A | 8/1998 | Sasaki et al. | |
| 6,021,624 A | 2/2000 | Richison et al. | |
| 7,722,254 B2 | 5/2010 | Murray | |
| 8,181,428 B2 | 5/2012 | Gustafsson | |
| D747,195 S | 1/2016 | Sanfilippo | |
| D747,202 S | 1/2016 | Sanfilippo | |
| D753,995 S | 4/2016 | Sanfilippo | |
| 9,327,867 B2* | 5/2016 | Stanley | B65D 75/008 |
| 9,802,719 B2* | 10/2017 | Stanley | B65B 3/04 |
| 10,457,457 B2* | 10/2019 | Arent | B65D 85/70 |
| 11,059,626 B2* | 7/2021 | Inagawa | B65D 75/008 |
| 11,878,841 B2* | 1/2024 | Inagawa | B65D 33/02 |
| 2004/0035865 A1 | 2/2004 | Rosen | |
| 2007/0068118 A1 | 3/2007 | Forss | |
| 2010/0016825 A1 | 1/2010 | Graf et al. | |
| 2010/0061664 A1 | 3/2010 | Gustafsson | |
| 2012/0266628 A1 | 10/2012 | Kieling et al. | |
| 2013/0071048 A1 | 3/2013 | Graf et al. | |
| 2013/0248540 A1 | 9/2013 | Darby et al. | |
| 2013/0292287 A1 | 11/2013 | Stanley et al. | |
| 2013/0292353 A1 | 11/2013 | Stanley et al. | |
| 2013/0292395 A1 | 11/2013 | Stanley et al. | |
| 2013/0292413 A1 | 11/2013 | Stanley et al. | |
| 2013/0292415 A1 | 11/2013 | Stanley et al. | |
| 2013/0294711 A1 | 11/2013 | Stanley et al. | |
| 2013/0337244 A1 | 12/2013 | Stanley et al. | |
| 2014/0033654 A1 | 2/2014 | Stanley et al. | |
| 2014/0033655 A1* | 2/2014 | Stanley | B65D 75/5883 53/456 |
| 2015/0028057 A1* | 1/2015 | Arent | B65D 75/5811 222/107 |
| 2015/0033671 A1* | 2/2015 | Stanley | B65B 3/045 53/410 |
| 2015/0034670 A1* | 2/2015 | Stanley | B65D 77/28 222/105 |
| 2015/0036950 A1* | 2/2015 | Stanley | B65D 83/771 383/104 |
| 2015/0121810 A1* | 5/2015 | Bourgeois | B65B 31/006 53/434 |
| 2015/0122373 A1 | 5/2015 | Bourgeois | |
| 2015/0122840 A1 | 5/2015 | Cox | |
| 2015/0122841 A1* | 5/2015 | McGuire | B65D 75/566 222/206 |
| 2015/0122842 A1* | 5/2015 | Berg, Jr. | B65D 31/16 222/173 |
| 2015/0122846 A1* | 5/2015 | Stanley | B65D 47/32 222/206 |
| 2015/0125099 A1* | 5/2015 | Ishihara | B65D 75/5877 493/212 |
| 2015/0125574 A1* | 5/2015 | Arent | B65D 75/525 426/106 |
| 2015/0126349 A1* | 5/2015 | Ishihara | B65D 33/02 493/203 |
| 2016/0176578 A1* | 6/2016 | Stanley | B65D 75/008 206/459.5 |
| 2016/0176582 A1* | 6/2016 | Mcguire et al. | B65D 35/02 206/277 |
| 2016/0176583 A1* | 6/2016 | Ishihara | B65D 75/008 53/452 |
| 2016/0176584 A1* | 6/2016 | Ishihara | B65D 75/008 493/243 |
| 2016/0176597 A1* | 6/2016 | Ishihara | B31B 70/00 493/243 |
| 2016/0221727 A1 | 8/2016 | Stanley | |
| 2016/0297569 A1* | 10/2016 | Berg, Jr. | B65D 75/008 |
| 2016/0297589 A1* | 10/2016 | You | B65D 75/008 |
| 2016/0297590 A1* | 10/2016 | You | B05B 11/026 |
| 2016/0297591 A1* | 10/2016 | You | B05B 11/026 |
| 2016/0325518 A1* | 11/2016 | Ishihara | B31B 50/00 |
| 2016/0362228 A1 | 12/2016 | Mcguire | |
| 2017/0001782 A1* | 1/2017 | Arent | B65D 75/008 |
| 2017/0233116 A1 | 8/2017 | Stanley et al. | |
| 2017/0305627 A1 | 10/2017 | Arent | |
| 2018/0237208 A1 | 8/2018 | Kieling et al. | |

FOREIGN PATENT DOCUMENTS

| | | |
|---|---|---|
| CN | 201745870 U | 2/2011 |
| CN | 104003067 A | 8/2014 |
| JP | 7-232744 A | 9/1995 |
| JP | 10-211972 A | 8/1998 |
| JP | 2000-109095 A | 4/2000 |
| JP | 2002-104431 A | 4/2002 |
| JP | 2006-27697 A | 2/2006 |
| JP | 2007-22655 A | 2/2007 |
| JP | 2007-186256 A | 7/2007 |
| JP | 2010-260614 A | 11/2010 |
| JP | 2013-10525 A | 1/2013 |
| JP | 2015-726 A | 1/2015 |
| JP | 2015-520706 A | 7/2015 |
| JP | 2015-520707 A | 7/2015 |
| JP | 6186546 B1 | 8/2017 |
| JP | 6186547 B1 | 8/2017 |
| JP | 6193535 B1 | 9/2017 |
| WO | WO 96/01775 A1 | 1/1996 |
| WO | WO 98/01354 A1 | 1/1998 |
| WO | WO 2005/063589 A1 | 7/2005 |
| WO | WO 2009/021329 A1 | 2/2009 |
| WO | WO 2012/073004 A2 | 6/2012 |
| WO | WO 2015/051539 A1 | 4/2015 |

OTHER PUBLICATIONS

International Search Report issued Nov. 22, 2016 in PCT/JP2016/076507 filed Sep. 8, 2016.

\* cited by examiner

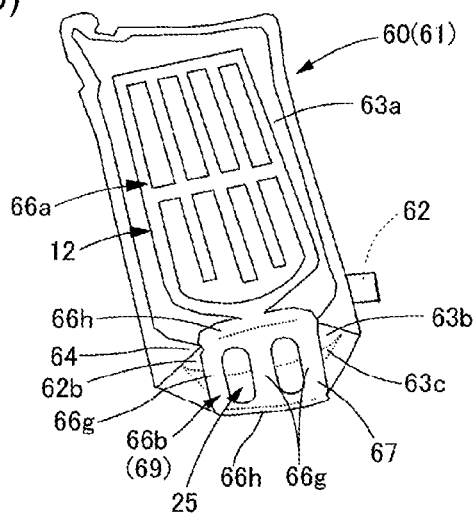

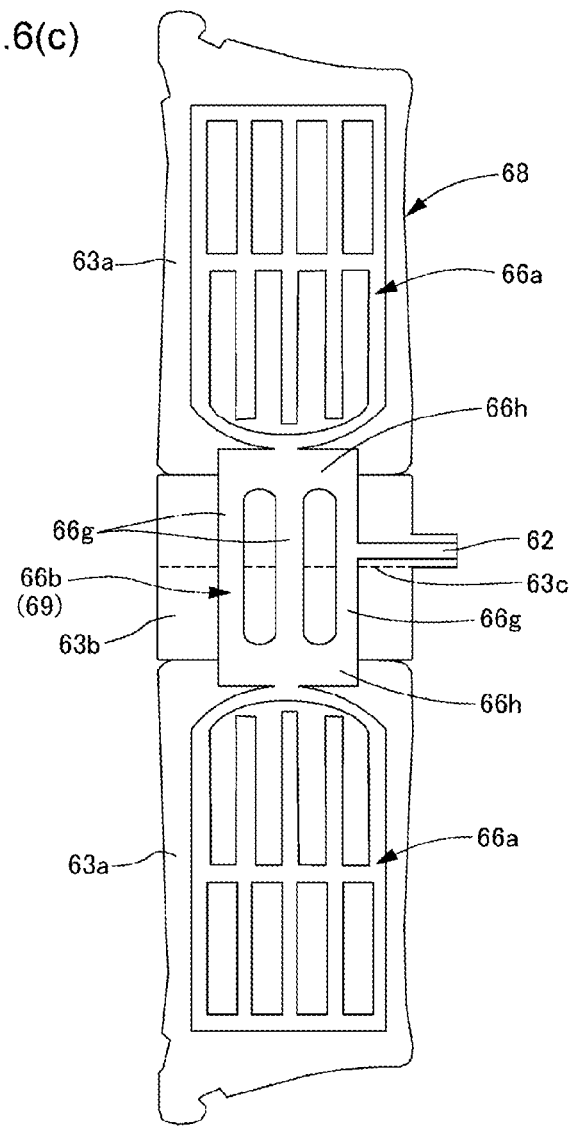

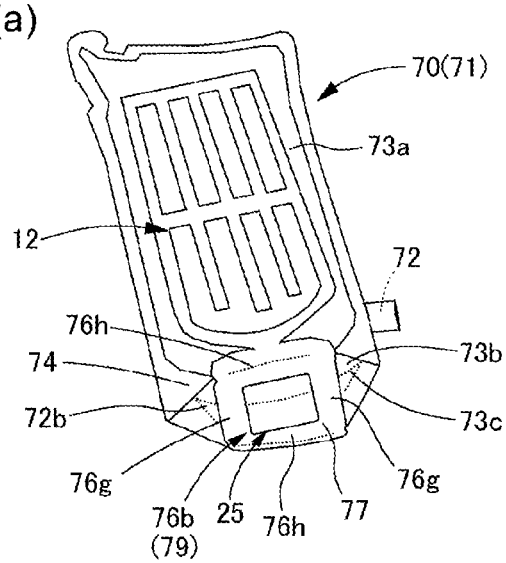

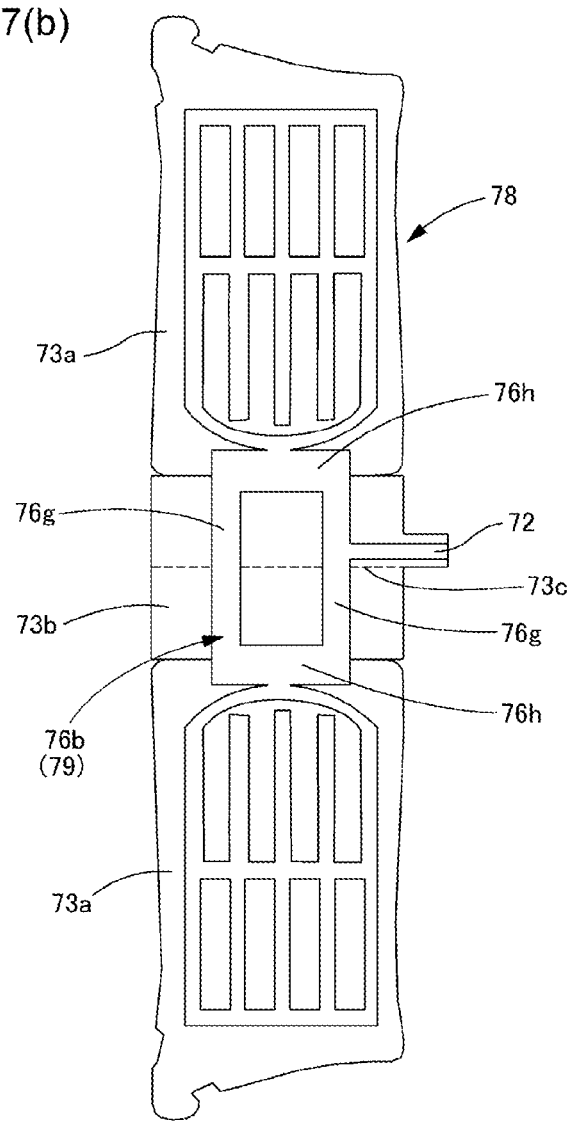

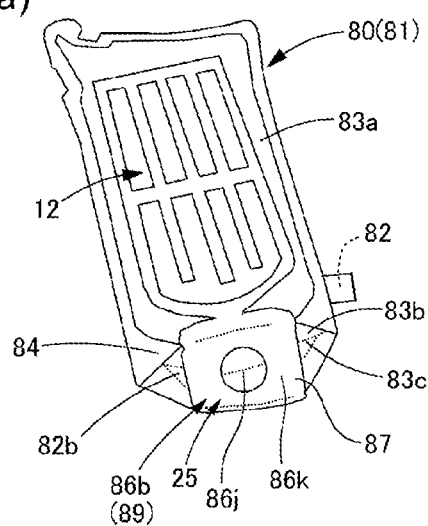

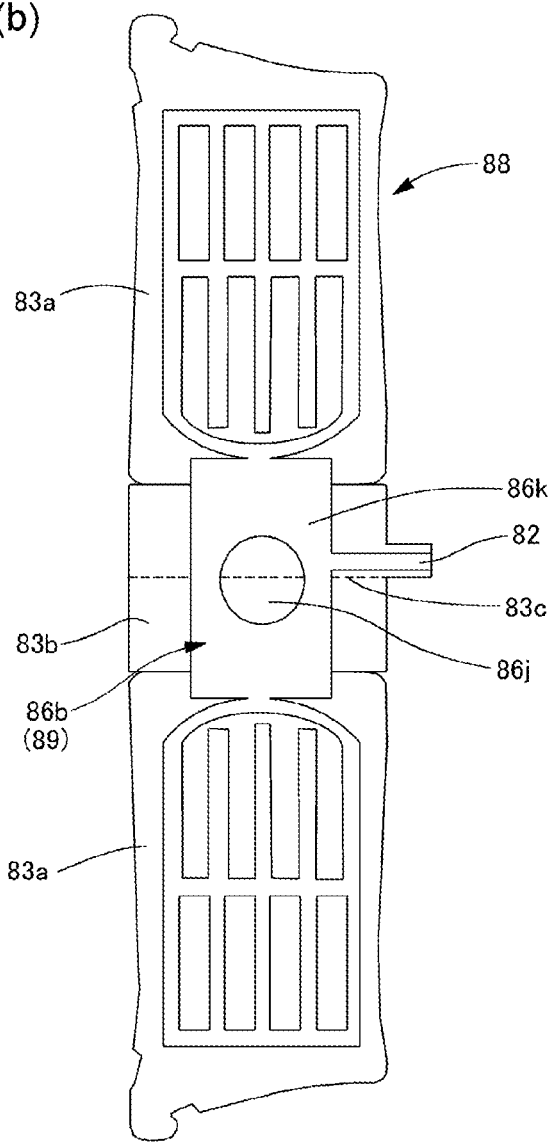

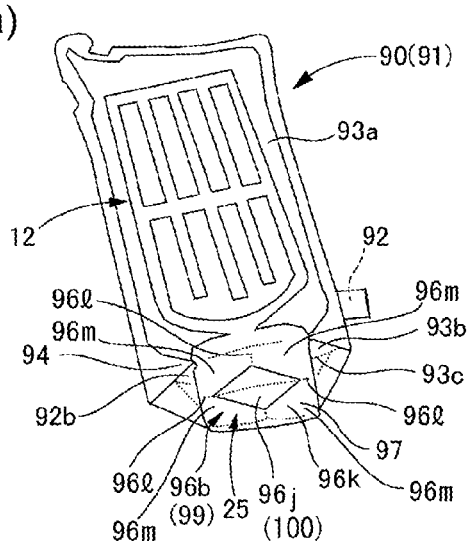

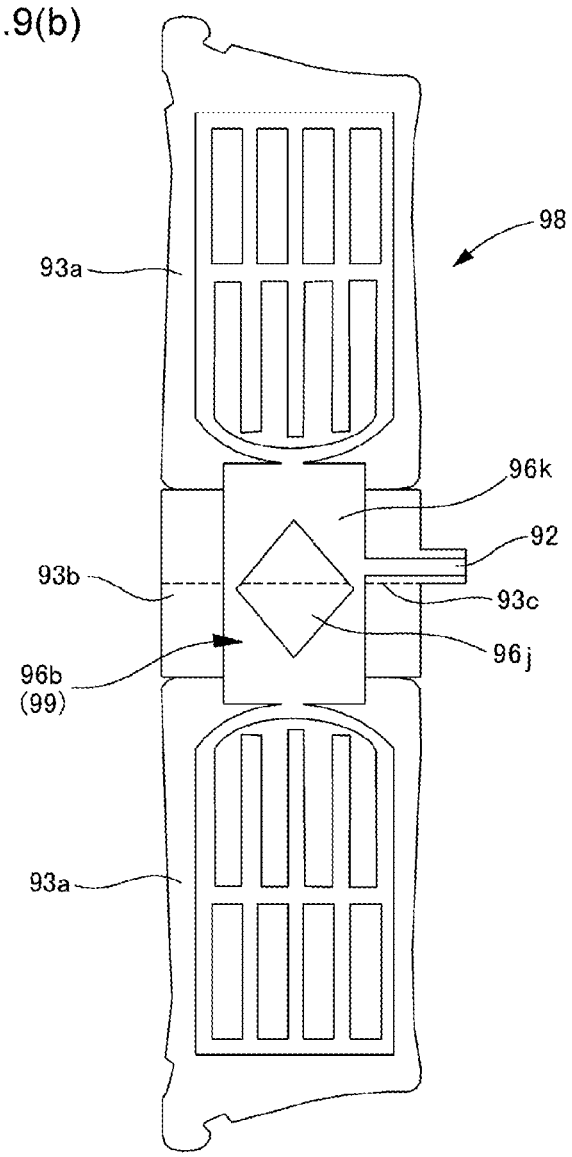

SHEET MATERIAL CONTAINER

CROSS-REFERENCE TO RELATED APPLICATIONS

This is a continuation of U.S. application Ser. No. 17/366,852, filed Jul. 2, 2021, which is a continuation of U.S. application Ser. No. 15/758,654, filed Mar. 8, 2018 (now U.S. Pat. No. 11,059,626), which is a National Stage of Application No. PCT/JP2016/076507, filed on Sep. 8, 2016, which claims the benefit of priority from Japanese Application No. PCT/JP2015/075582, filed Sep. 9, 2015; the entire contents of which are incorporated herein by reference.

TECHNICAL FIELD

The present invention relates to a sheet material container that is made of a sheet material including a plurality of film layers.

BACKGROUND ART

In recent years, synthetic resin containers that contain various types of liquids and other content materials, which have a reduced impact on the environment, have been realized, and various types of thin containers that use a reduced amount of resin have been developed. Also, bag-like containers such as pouches are widely used as containers that contain various types of detergents, food products, and the like. Bag-like containers such as pouches are formed by using a thin sheet material made of a synthetic resin that is flexible and pliable.

Bag-like containers such as pouches are soft thin containers, and thus are inferior to bottle containers in terms of self-standing characteristics when displayed in stores and shops, and impact resistance when dropped. For this reason, a sheet material container (self-standing bag) has been developed that has improved self-standing characteristics and impact resistance by forming a closed cell (reinforcing filler-filled portion) in a bonding portion where the peripheral edge portions of a pair of front sheet portions and a gusset sheet portion are bonded, and filling the closed cell with a fluid such as air or water as a filler (see, for example, Patent Literature 1). In the sheet material container according to Patent Literature 1, the sheet material that is used to constitute the front sheet portions and the gusset sheet portion includes, as the innermost layer, a sealant layer made of, for example, polyethylene, and the sealant layers are stacked together and then heat sealed by applying heat, and the bonding portion is formed at the peripheral edge portions thereof. Also, the closed cell is provided in the bonding portion by providing a non-heated region when the peripheral edge portions of the front sheet portion and the gusset sheet portion are heat sealed so as to form a non-bonding portion, supplying air or water into the non-bonding portion, and sealing the non-bonding portion.

For a sheet material container (bag-in-box bag), a technique has also been developed that improves self-standing characteristics, cushioning characteristics, and the like of the bag by providing at least one strip-shaped air-filled layer that extends in the up and down direction of the bag in each of a pair of flat portions and two side portions (see, for example, Patent Literature 2).

CITATION LIST

Patent Literature

Patent Literature 1: JP 2006-27697A
Patent Literature 2: JP 2002-104431A

SUMMARY OF INVENTION

The present invention relates to a sheet material container being made of a sheet material and including a body portion and a bottom portion that is to be disposed on a placement surface, and the sheet material including a plurality of film layers, and a body portion sheet that constitutes the body portion includes a bonding portion where peripheral edge portions of the sheet materials are bonded. In a bottom surface sheet constituting the bottom portion, a non-adhesive region is provided in the plurality of film layers, and the non-adhesive region forms a bottom filler-filled portion when it is filled with a filler. The bottom filler-filled portion extends annularly around a non-filled portion in the bottom surface sheet, and forms at least three protruding leg portions that are to be placed on the placement surface to allow the container to stand by itself. The protruding leg portions protruding toward the placement surface past other portions in the bottom filler-filled portion due to a leg forming portion provided in the bottom portion.

Also, the present invention relates to a production method for producing the sheet material container as described above, the method including the steps of: forming a web of the sheet material in which the non-adhesive region is provided in the bottom surface sheet portion; bonding together a peripheral edge portion of a portion of the sheet material corresponding to an individual sheet material container in the web; cutting the bonded web to predetermined dimensions; and filling the non-adhesive region with a filler to form the bottom filler-filled portion.

Also, the present invention relates to a container-forming sheet material that is used to form the sheet material container as described above, and is formed by using a sheet material including a plurality of film layers, the container-forming sheet material including: a body portion sheet; a bonding portion that is formed in a peripheral edge portion of the body portion sheet; and a bottom surface sheet, wherein the bottom surface sheet includes a folding crease line, and is folded flat via the folding crease line. In the bottom surface sheet, a non-adhesive region that is to be filled with a filler is provided in the plurality of film layers.

BRIEF DESCRIPTION OF DRAWINGS

FIG. 6(b) is a schematic perspective view of the container product that uses a sheet material container according to another embodiment, as viewed from the bottom surface side.

FIG. 6(c) is a flat-out front view of a container-forming sheet material that is used to form a sheet material container according to another embodiment.

FIG. 7(a) is a schematic perspective view of a container product that uses a sheet material container according to another embodiment, as viewed from the bottom surface side.

FIG. 7(b) is a flat-out front view of a container-forming sheet material that is used to form a sheet material container according to another embodiment.

FIG. 8(a) is a schematic perspective view of a container product that uses a sheet material container according to another embodiment, as viewed from the bottom surface side.

FIG. 8(b) is a flat-out front view of a container-forming sheet material that is used to form a sheet material container according to another embodiment.

FIG. 9(a) is a schematic perspective view of a container product that uses a sheet material container according to another embodiment, as viewed from the bottom surface side.

FIG. 9(b) is a flat-out front view of a container-forming sheet material that is used to form a sheet material container according to another embodiment.

DESCRIPTION OF EMBODIMENTS

Figure 1:
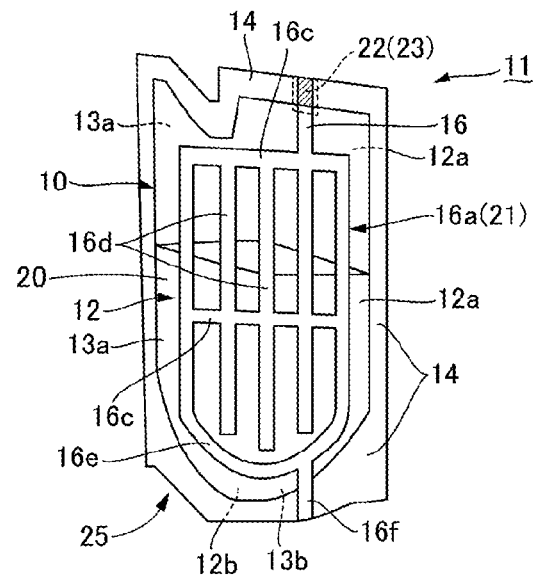
FIG. 1 is a schematic perspective view of a container product that uses a sheet material container according to a preferred embodiment of the present invention.

With the sheet material container disclosed in Patent Literature 1, the closed cell that is the reinforcing filler-filled portion can be formed only in the bonding portion where the peripheral edge portions of the front sheet portion and the gusset sheet portion are bonded as a result of the sealant layers being seal-bonded through heat sealing, and it is therefore difficult to reinforce portions other than the bonding portion by using the closed cell, or enhance rigidity.

The sheet material container disclosed in Patent Literature 2 is merely configured such that at least one strip-shaped air-filled layer that extends in the up and down direction of the bag is provided in each of a pair of flat portions and two side portions, and an air-filled layer is not provided in the bottom portion. Accordingly, the sheet material container of Patent Literature 2 is problematic in terms of improving self-standing stability and drop strength of the sheet material container, or enhancing compression strength in the lateral direction.

The present invention relates to a sheet material container, in which, by using a filler-filled portion, three-dimensional shape retaining properties of the container can be improved, irrespective of whether the amount of content material is large or small, drop strength can be enhanced, or three-dimensional shape forming properties of a container-forming sheet material can be improved, as well as a production method for producing the sheet material container, and a container-forming sheet material that is used to form the sheet material container.

The present invention relates to a sheet material container being made of a sheet material and including a body portion and a bottom portion that is to be disposed on a placement surface, and the sheet material including a plurality of film layers, wherein a body portion sheet that constitutes the body portion includes a bonding portion where peripheral edge portions of the sheet materials are bonded. In a bottom surface sheet constituting the bottom portion, a non-adhesive region is provided in the plurality of film layers, and the non-adhesive region forms a bottom filler-filled portion when it is filled with a filler. The bottom filler-filled portion extends annularly around a non-filled portion in the bottom surface sheet, and forms at least three protruding leg portions that are to be placed on the placement surface to allow the container to stand by itself. The protruding leg portions protrude toward the placement surface past other portions in the bottom filler-filled portion due to a leg forming portion provided in the bottom portion.

Also, the present invention relates to a production method for producing the sheet material container described above, the method including the steps of: forming a web of the sheet material in which the non-adhesive region is provided in the bottom surface sheet portion; bonding together a peripheral edge portion of a portion of the sheet material corresponding to an individual sheet material container in the web; cutting the bonded web to predetermined dimensions; and filling the non-adhesive region with a filler to form the bottom filler-filled portion.

Furthermore, the present invention relates to a container product that uses the sheet material container described above, wherein a content material is contained in a containing portion that is surrounded by the body portion and the bottom portion.

Also, the present invention relates to a container-forming sheet material that is used to form the sheet material container described above, and is formed by using a sheet material including a plurality of film layers, the container-forming sheet material including: a body portion sheet; a bonding portion that is formed in a peripheral edge portion of the body portion sheet; and a bottom surface sheet, wherein the bottom surface sheet includes a folding crease line, and is folded flat via the folding crease line. In the bottom surface sheet, a non-adhesive region that is to be filled with a filler is provided in the plurality of film layers.

Furthermore, the present invention relates to a production method for producing a container-forming sheet material, the method including the steps of: forming a web of the sheet material in which the non-adhesive region is provided in the bottom surface sheet; bonding together a peripheral edge portion of a portion corresponding to an individual container-forming sheet material in the web; and cutting the bonded web to predetermined dimensions.

Figure 2A:
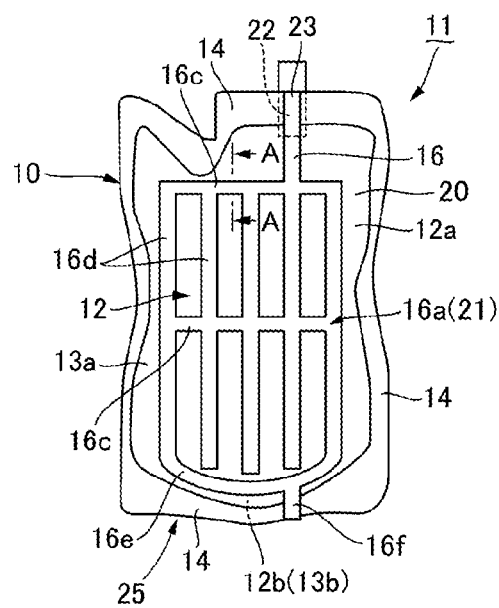
FIG. 2(a) is a schematic front view of the container product that uses a sheet material container according to a preferred embodiment of the present invention, showing a state before an external communication opening is sealed.
Figure 2B:
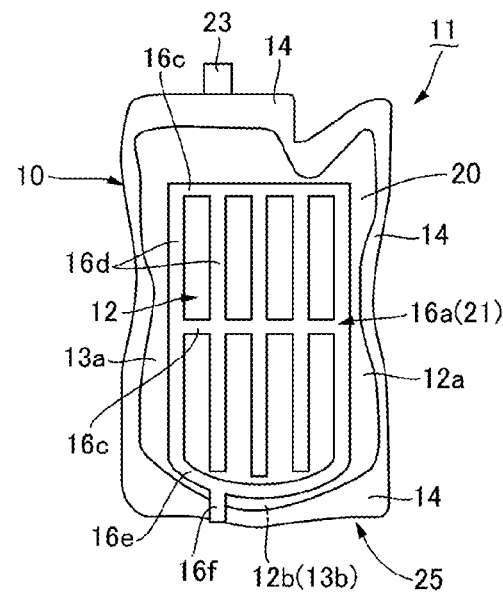
FIG. 2(b) is a schematic rear view of the container product that uses a sheet material container according to a preferred embodiment of the present invention, showing a state before the external communication opening is sealed.
Figure 3:
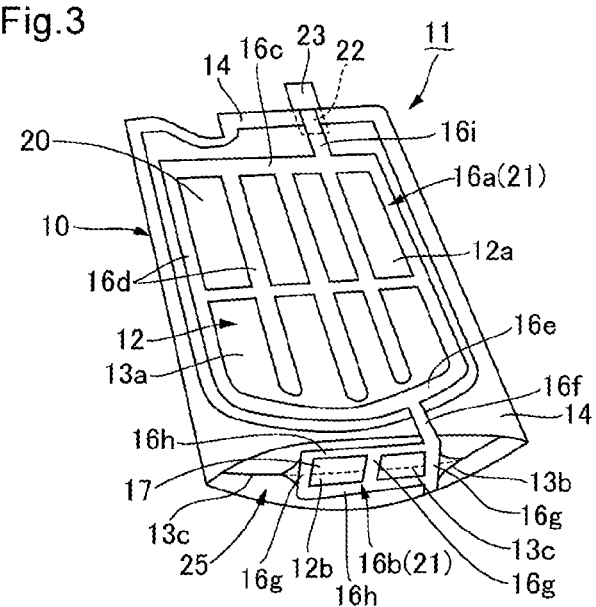
FIG. 3 is a schematic perspective view of the container product that uses a sheet material container according to a preferred embodiment of the present invention as viewed from the bottom surface side, showing a state before the external communication opening is sealed.

A sheet material container 10 according to a preferred embodiment of the present invention shown in FIGS. 1 to 3 contains, for example, a liquid detergent as a content liquid, and is preferably productized as a bag-like container product 11 that is similar to a self-standing pouch. The sheet material container 10 according to the present embodiment is formed by using a thin sheet material 20 made of a synthetic resin that is flexible and pliable. Also, the sheet material container 10 according to the present embodiment includes a body portion sheet 12 (composed of body portion sheets 12a and 12a) that constitutes a body portion 12, and a bottom surface sheet 12b that constitutes a bottom portion 25. Preferably, inflated filler-filled portions 16a and 16b are provided in the body portion sheet 12a and the bottom surface sheet 12b, the filler-filled portions 16a and 16b being formed between a plurality of stacked film layers of the sheet material and being filled with a filler. By providing the filler-filled portion 16b in the bottom surface sheet 12b, the bottom portion 25 that is to be disposed on a placement surface can be effectively reinforced, and drop strength can be enhanced.

Alternatively, three-dimensional shape retaining properties of the sheet material container 10 when the amount of content material is small can be enhanced, the rigidity of a placement portion 17 that allows the container to stand by itself can be enhanced by the filler-filled portion 16b, and the self-standing stability can be improved. Furthermore, by providing the filler-filled portion 16a in the body portion sheet 12a using it in combination with the filler-filled portion 16b provided in the bottom surface sheet 12b, three-dimensional shape retaining properties of a containing portion 12 surrounded by the body portion 12 and the bottom portion 25 when the amount of content material is small can be further enhanced, and a certain level of elasticity or rigidity can be imparted relative to the compression strength when the body portion 12 is gripped. Accordingly, the self-standing stability of the sheet material container 10 can be improved.

Figure 4A:
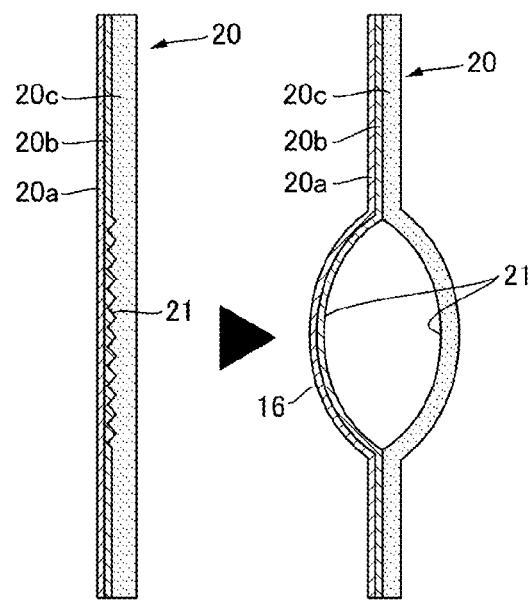
FIG. 4(a) is a schematic cross-sectional view taken along the line A-A in FIG. 2(a), illustrating a filler-filled portion that is formed by filling a non-adhesive region with a fluid.

The sheet material container 10 according to the present embodiment is a container being made of a sheet material 20 and including a body portion 11 and the bottom portion 25 that is to be disposed on a placement surface, and the sheet material 20 including a plurality of film layers 20a, 20b, and 20c (see FIG. 4(a)), wherein a body portion sheet 12a that constitutes the body portion 11 includes a bonding portion 14 where the peripheral edge portions of the sheet materials are bonded, a bottom surface sheet 12b that constitutes the bottom portion 25 includes a non-adhesive region 21 that is formed between the plurality of film layers 20a, 20b, and 20c, and a bottom filler-filled portion 16b is formed by the non-adhesive region 21 being filled with a filler.

That is, the sheet material container 10 according to the present embodiment is a bag-like container formed by using a sheet material 20 that is formed by stacking a plurality of film layers 20a, 20b, and 20c (see FIG. 4(a)), and includes body portion sheets 12a, a bonding portion 14, and a bottom surface sheet 12b that together form a containing portion that can contain a content material such as a content liquid, the bonding portion 14 being the portion where the peripheral edge portions of the body portion sheets 12a of the sheet materials are bonded. The bottom surface sheet 12b preferably includes a folding crease line 13c. In a state in which the bottom surface sheet 12b is folded to be flat via the folding crease line 13c, the bottom surface sheet 12b unfolds when, for example, a content material is contained in the containing portion 12, or when the non-adhesive region 21 is filled with a filler, and the bottom filler-filled portion 16b is formed, and when the bottom surface sheet 12b is placed so as to be in line contact or surface contact with the placement surface, the placement portion 17 that allows the container 10 to stand by itself is formed. At least in the bottom surface sheet 12b, a non-adhesive region 21 is provided between a plurality of film layers 20a, 20b, and 20c that constitute the sheet material 20 constituting the bottom surface sheet 12b. The non-adhesive region 21 is filled with a filler, preferably, a fluid such as air or water, and as shown in FIG. 3, a reinforcing bottom filler-filled portion 16b is formed as a result of the non-adhesive region 21 being inflated as a result of being filled with the filler.

Also, in the present embodiment, as shown in FIGS. 1 to 3, the containing portion 12 includes a pair of front and back body portion sheets 12a, and in each of the body portion sheets 12a, a non-adhesive region 21 is provided between a plurality of film layers 20a, 20b, and 20c that constitute the sheet material 20 constituting the body portion sheets 12a, and a front filler-filled portion 16a is formed as a result of the non-adhesive region 21 being filled with a filler, preferably, a fluid such as air or water. The non-adhesive region 21 provided in the body portion sheet 12a to form the front filler-filled portion 16a is in communication with the non-adhesive region 21 for forming the bottom filler-filled portion 16b in the bottom surface sheet 12b.

Furthermore, in the present embodiment, the sheet material container 10 is formed as a bag-like container formed through, for example, heat sealing, as bonding portions 14, the peripheral edge portions of a pair of front and back front sheets 13a and 13a made of the sheet material 20 and the peripheral edge portion of a bottom surface gusset portion sheet 13b that can be folded in half inward of the pair of front and back front sheets 13a and 13a via the folding crease line 13c. The portions of the pair of front and back front sheets 13a and 13a that are surrounded by the bonding portion 14 are a pair of front and back body portion sheets 12a and 12a of the containing portion sheet portion 12, and the portion of the bottom surface gusset portion sheet 13b surrounded by the bonding portion 14 is the bottom surface sheet 12b of the containing portion sheet portion 12.

As used herein, the term "heat sealing" used in this specification is not limited to heat sealing that uses a heated heat seal bar or roll, and encompasses any heat sealing with which bonding portions can be heat sealed, such as ultrasonic sealing, and high frequency sealing.

Also, the bonding portion 14 is not necessarily formed by heat sealing the back surfaces of the sheet materials 20, and may be formed by, for example, using an adhesive agent to bond the sheet materials 20.

In the present embodiment, the non-adhesive region 21 provided in each of the sheets (body portion sheets) 12a and 12a constituting the body portion and the bottom surface sheet 12b is formed, as shown in FIG. 4, between a sealant film layer 20c that is the innermost layer, which will be described later, and a barrier film layer 20b that is the intermediate layer. The film layers 20b and 20c are bonded by using a laminate adhesive agent (not shown). The non-adhesive regions 21 can be formed into a desired shape by using an application pattern that includes the non-adhesive region 21 to apply a laminate adhesive agent onto a surface of the sealant film layer 20c or the barrier film layer 20b.

Also, when the plurality of film layers 20a, 20b, and 20c are bonded using a laminate adhesive agent, the non-adhesive region 21 can also be formed into a desired shape by performing non-adhesive treatment on a portion of a surface of at least one of the film layers 20a, 20b, and 20c that corresponds to the non-adhesive region 21. The non-adhesive treatment can be easily performed by applying a non-adhesive agent (glue deactivation agent) onto a portion that corresponds to the non-adhesive region 21 so as to bring the portion into a glue deactivation state. Any glue deactivation agent can be used as the glue deactivation agent, as long as it can prevent a pressure-sensitive adhesive layer from bonding. For example, it is preferable to use printing inks used in offset printing, flexographic printing, and letterpress printing (relief printing), a medium ink, an ink dedicated for glue deactivation, or the like. It is also preferable to use a thermosetting or ultraviolet radiation curable ink. Also, in this specification, the term "adhesion" and similar terms also encompass "pressure-sensitive adhesion".

In the present embodiment, the sheet material 20 that constitutes each of the pair of front and back front sheets 13a and 13a, and the bottom surface gusset portion sheet 13b is, as shown in FIG. 4(a), for example, a three-layer structured sheet material in which a substrate film layer 20a that is the outermost layer, a sealant film layer 20c that is the innermost layer, and a barrier film layer 20b that is the intermediate layer interposed between the substrate film layer 20a and the barrier film layer 20b are stacked. The non-adhesive region 21 is formed between the sealant film layer 20c that is the innermost layer and the barrier film layer 20b that is the intermediate layer.

Figure 4B:
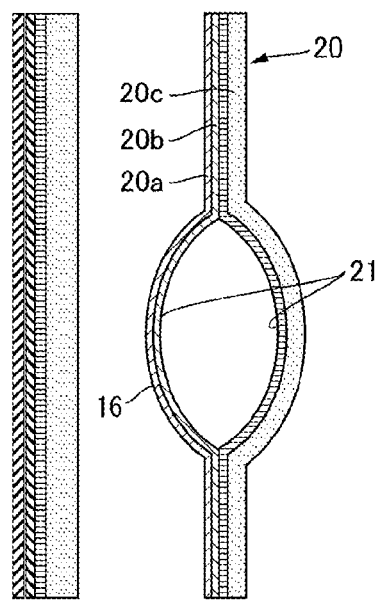
FIG. 4(b) is a schematic cross-sectional view showing another embodiment of the filler-filled portion that is formed by filling a non-adhesive region with a fluid.

As shown in FIG. 4(b), in the sheet material 20 that constitutes each of the pair of front and back front sheets 13a and 13a, and the bottom surface gusset portion sheet 13b, the barrier film layer 20b that is the intermediate layer may be formed by using a plurality of layers. The non-adhesive region 21 may be formed between the plurality of layers that constitute the barrier film layer 20b that is the intermediate layer. An example of a sheet material 20 having the above-described layer structure is a material composed of, from the outer layer, ONy 15 μm/adhesive layer/VM-PET 12 μm/(non-adhesive region)/adhesive layer/VM-ONy 15 μm/adhesive layer/LLDPE 40 μm (innermost layer). As used herein, ONy stands for oriented nylon, VM-ONy refers to a metal-deposited oriented nylon such as aluminum-deposited oriented nylon, and VM-PET refers to a metal-deposited polyethylene terephthalate such as aluminum-deposited polyethylene terephthalate.

Figure 4C:
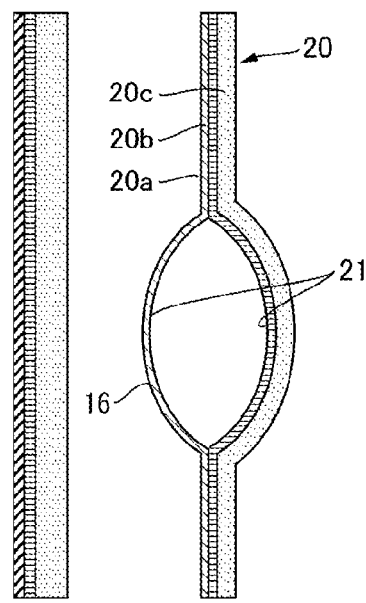
FIG. 4(c) is a schematic cross-sectional view showing another embodiment of the filler-filled portion that is formed by filling a non-adhesive region with a fluid.

Also, as shown in FIG. 4(c), in the sheet material 20 that constitutes each of the pair of front and back front sheets 13a and 13a, and the bottom surface gusset portion sheet 13b, the non-adhesive region 21 may be formed between the substrate film 20a and the barrier film layer 20b that is the intermediate layer. An example of a sheet material 20 having the above-described layer structure is a material composed of, from the outer layer, inorganic substance-deposited PET 12 μm/(non-adhesive region)/adhesive layer/VM-PET 12 μm/adhesive layer/LLDPE 40 μm (innermost layer). As used herein, the term "inorganic substance-deposited PET" refers to PET on which, for example, alumina, silicon oxide, or the like is deposited.

Figure 4D:
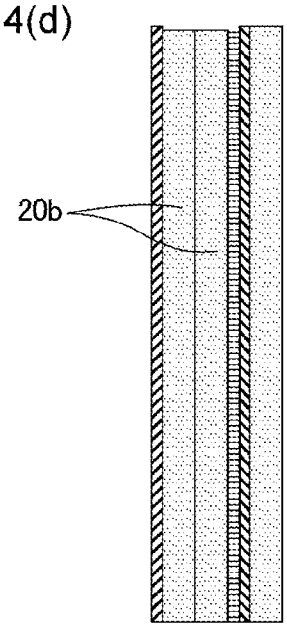
FIG. 4(d) is a schematic cross-sectional view showing another layer configuration of a sheet material in which a non-adhesive region is provided.

Furthermore, in the sheet material 20 that constitutes each of the pair of front and back front sheets 13a and 13a, and the bottom surface gusset portion sheet 13b, in the case where the means for bonding films includes fusion such as thermal fusion and ultrasonic fusion, the sheet material 20 may be configured such that, for example, as shown in FIG. 4(d), the barrier film layer 20b that is the intermediate layer includes two sealant layers, and the non-adhesive region 21 is formed between these two sealant layers. An example of a sheet material 20 having the above-described layer structure is a material composed of, from the outer layer, ONy 15 μm/adhesive layer/VM-PET 12 μm/adhesive layer/LLDPE 40 μm/(non-adhesive region)/LLDPE 40 μm/adhesive layer/VM-PET 12 μm/adhesive layer/ONy 15 μm/adhesive layer/LLDPE 40 μm (innermost layer).

Hereinafter, bonding using an adhesive agent will be described by taking an example in which the non-adhesive region 21 is formed between the sealant film layer 20c that is the innermost layer and the barrier film layer 20b that is the intermediate layer, with reference to FIG. 4(a). However, as described above, the non-adhesive region 21 may be provided between the layers that constitute the barrier film layer 20b that is the intermediate layer, or may be provided between the barrier film layer 20b and the substrate film layer 20a.

The substrate film layer 20a that is the outermost layer can be formed by using an oriented or non-oriented film made of, for example, a polyester such as polyethylene terephthalate (PET), polyethylene naphthalate (PEN), or polybutylene terephthalate (PBT), a polyolefin such as polyethylene (PE), polypropylene (PP) or polystyrene (PS), or a polyamide (PA) such as nylon-6 or nylon-66.

The substrate film layer 20a preferably has a thickness of, for example, 3 to 200 μm, more preferably 3 to 100 μm, and even more preferably 6 to 30 μm.

The sealant film layer 20c that is the innermost layer can be formed by using, for example, a low density polyethylene resin (LDPE), a medium density polyethylene resin (MDPE), a high density polyethylene resin (HDPE), a linear low density polyethylene resin (L-LDPE), a polypropylene resin (PP), or the like.

The sealant film layer 20c that is the innermost layer preferably has a thickness of, for example, 15 to 200 μm, more preferably 20 to 180 μm, and more preferably 30 to 170 μm.

The barrier film layer 20b that is the intermediate layer can be formed by using, for example, an aluminum-deposited film, an ethylene-vinyl alcohol copolymer (EVOH), an aluminum foil, poly(vinylidene chloride) (PVDC), a PVDC coated film, a ceramics-deposited film, or the like. In the case where fusion is used as the means for forming an adhesive portion around the non-adhesive region 21 of the sheet material 20, it is preferable that the barrier film layer 20b that is the intermediate layer further includes two sealant layers selected from a low density polyethylene resin (LDPE) layer and a linear low density polyethylene resin (L-LDPE) layer.

The barrier film layer 20b preferably has a thickness of, for example, 3 to 100 μm, more preferably 3 to 50 μm, and even more preferably 5 to 25 μm. In the barrier film layer 20b that is the intermediate layer, in the case where the non-adhesive region 21 of the sheet material 20 is provided within the barrier film layer 20b, the barrier film layer 20b preferably has a thickness of, for example, 80 μm to 200 μm, more preferably 100 to 180 μm, and even more preferably 100 to 160 μm.

These film layers 20a, 20b, and 20c are stacked and easily bonded into one unitary body by using a known lamination method such as, for example, dry lamination, non-solvent dry lamination, or hot melt lamination with the use of, for example, a known laminate adhesive agent, and a sheet material 20 is thereby formed.

In the case of forming the non-adhesive region when thermally fusing two films, the non-adhesive region can be formed by using a concave and convex mold (an adhesive portion is formed by the convex portion, and a non-adhesive region is formed by the concave portion) to press the sealant layers of inner and outer films that are in a face-to-face relationship. It is also possible to form the non-adhesive region by interposing a sheet (PET sheet or the like) that does not thermally adhere to a sealant, the sheet having been cut to have a shape of the non-adhesive region, between inner and outer films, and pressing the entirety thereof with a planar mold.

Examples of the method of bonding adhesive regions that are regions other than the non-adhesive region 21 include, in addition to bonding using an adhesive agent, thermal fusion, ultrasonic fusion, laser fusion, compression bonding, and the like. From the viewpoint of reducing the thickness of the layer configuration to be thinner, and increasing the degree of freedom of the application pattern, the bonding method is preferably performed using an adhesive agent, and from the viewpoint of obtaining a certain level of strength irrespective of the material of the adhesive agent, the bonding method is preferably fusion.

Also, in the present embodiment, in the pair of front and back front sheets 13a and 13a, and the bottom surface gusset portion sheet 13b, the sealant film layer 20c that is the innermost layer and the barrier film layer 20b that is the intermediate layer are bonded, as described above, by using a predetermined application pattern that includes the non-adhesive region 21 to apply a laminate adhesive agent onto the surface of the sealant film layer 20c or the barrier film layer 20b. By doing so, in each of the pair of front and back body portion sheets 12a and 12a surrounded by the bonding portion 14 at the peripheral edge portions of the pair of front sheets 13a and 13a, as shown in FIGS. 2(a) and 2(b), a non-adhesive region 21 for forming a reinforcing front filler-filled portion 16a that includes a horizontal filled portion 16c, a vertical filled portion 16d, and a bottom curved filled portion 16e is formed between the sealant film layer 20c and the barrier film layer 20b, with the rib-shaped filled portions 16c, 16d, and 16e being in communication with each other. Also, in the bottom surface sheet portion 12b surrounded by the bonding portion 14 at the peripheral edge portion in the bottom surface gusset portion sheet 13b, as shown in FIG. 3, a non-adhesive region 21 for forming a reinforcing bottom filler-filled portion 16b that includes intersecting filled portions 16g and communication filled portions 16h is formed between the sealant film layer 20c and the barrier film layer 20b, while being in communication with the front filler-filled portions 16a of the pair of front and back body portion sheets 12a and 12a via a connection portion filler-filled portion 16f.

In the present embodiment, the non-adhesive region 21 is formed between the sealant film layer 20c that is the innermost layer and the barrier film layer 20b that is the intermediate layer, and it is therefore possible to easily provide the connection portion filler-filled portion 16f for allowing each of the front filler-filled portions 16a provided in the pair of front and back body portion sheets 12a and 12a and the bottom filler-filled portion 16b provided in the bottom surface sheet portion 12b to communicate with each other such that the connection portion filler-filled portion 16f extends across the bonding portion 14 provided at the bottom portion of the sheet material container 10.

Furthermore, in the present embodiment, an external communication opening 22 is provided for supplying a filler into the non-adhesive region 21, and is open in the bonding portion 14 at the upper portion of the sheet material container 10 (see FIG. 1, FIG. 2(a), FIG. 2(b), FIG. 3, and FIG. 5). The external communication opening 22 is formed so as to be open in the bonding portion 14 at the upper portion of one of the pair of front and back front sheets 13a and 13a that is on the front side. The external communication opening 22 is configured such that, for example, a seal-bonding piece 23 is adhesively attached so as to cover an inner wall surface of the external communication opening 22. With this configuration, the external communication opening 22 can be easily sealed after a fluid has been injected. That is, in the external communication opening 22, one of the opposing inner wall surfaces is a wall surface formed by the sealant film layer 20c and the other inner wall surface is a wall surface formed by the barrier film layer 20b (see FIG. 4), and thus in this state, it is difficult to seal the external communication opening 22 using heat sealing after the non-adhesive region 21 has been filled with a filler. For this reason, by adhesively attaching a seal-bonding piece whose one inner wall surface is the sealant film layer to cover the other inner wall surface formed by the barrier film layer 20b, and heat sealing the upper portion where the external communication opening 22 is formed after a filler has been filled, the external communication opening 22 can be easily sealed. The seal-bonding piece 23 may be provided so as to extend upward from the external communication opening 22. The extension portion is removed after the external communication opening 22 has been sealed through heat sealing. The extension portion of the seal-bonding piece 23 is not necessarily removed, and may be left.

Also, a non-return valve (not shown) that is preferably made of a heat sealable resin (for example, polyethylene resin) may be interposed between the adhesively attached seal-bonding piece 23 and one of the inner wall surfaces formed by the sealant film layer 20c in the external communication opening 22 so as to be in close contact therewith. By interposing the non-return valve, it is possible to effectively avoid leakage of the charged filler to the outside from the non-adhesive region 21 via the external communication opening 22 until the external communication opening 22 is sealed. With the non-return valve, by performing heat sealing while the non-return valve is interposed, the non-return valve is flattened and deformed to close the flow path for the filler. Accordingly, the external communication opening 22 can be easily sealed.

The external communication opening 22 is not necessarily closed (sealed) through heat sealing, and may be closed by using, for example, an air valve used in a beach ball or the like instead of the seal-bonding piece 23. Also, the external communication opening 22 may also be closed by using an adhesive agent.

Here, in the present embodiment, as the filler used to fill the non-adhesive region 21 to form the filler-filled portions 16a, 16b, and 16f (the front filler-filled portion 16a, the bottom filler-filled portion 16b, and the connection portion filler-filled portion 16f), it is preferable to use a fluid selected from gasses such as nitrogen and air, water, an aqueous solution, and oil. It is also possible to use a powder, a resin, a foam, and the like. As the foam, it is possible to use a material that foams as a result of being irradiated with ultraviolet rays such as that in a UV curable foamable gasket. When a UV curable foamable gasket is contained in the non-adhesive region 21, and then irradiated with ultraviolet rays from the outside of the container 10, the UV curable foamable gasket is foamed and cured, and retains its inflated state, thereby forming the filler-filled portions 16a, 16b, and 16f having any type of inflated shape, or a rib shape. The filler-filled portions 16a, 16b, and 16f may also be formed by mixing a fluid, a powder, and the like as described above as appropriate and filling the mixture into the non-adhesive region 21. As the filler, from the viewpoint of reducing weight, it is more preferable to use a gas such as nitrogen or air.

Figure 5:
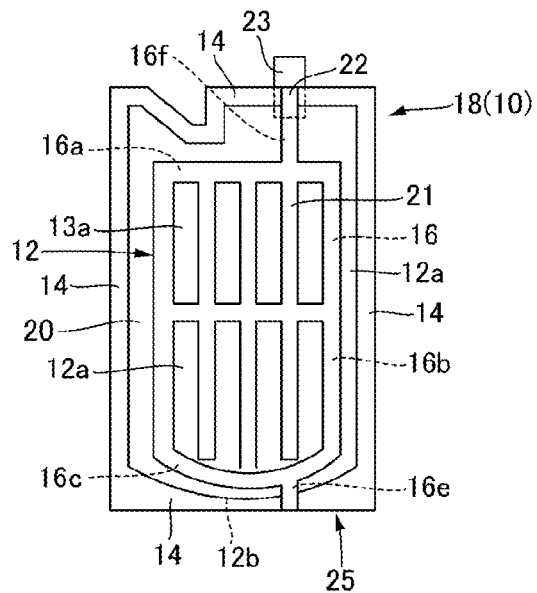
FIG. 5 is a front view of a container-forming sheet material before it is productized, the container-forming sheet material being for use to form the sheet material container according to a preferred embodiment of the present invention.

In order to produce the sheet material container 10 according to the present embodiment, for example, a web of the sheet material 20 is formed in which non-adhesive regions 21 that correspond to a plurality of sheet material containers 10 are continuously provided in the flow direction (machine direction) of a web production apparatus by bonding the sealant film layer 20c that is the innermost layer and the barrier film layer 20b that is the intermediate layer using a laminate adhesive agent applied in a predetermined application pattern including the non-adhesive regions 21. Then, in a bag production apparatus, the formed web of the sheet material 20, in which a portion of the web corresponding to the bottom surface gusset portion sheet 13b is folded inward of the bottom portion between a pair of stacked portions of the web corresponding to the front sheets 13a and 13a so as to have an M-shaped cross section, is fed in the flow direction of the bag production apparatus. Also, in a portion of the fed web of the sheet material 20 that corresponds to an individual sheet material container 10, the peripheral edge portions of the sheets 13a, 13a, and 13b of the individual sheet material container 10 are bonded using, for example, heat sealing, excluding a portion that will serve as a content liquid injection opening. Furthermore, the heat sealed web is cut at the bonding portion 14 between adjacent individual sheet material containers 10. As a result, a sheet material container 10 as shown in FIG. 5 that is folded flat so as to have a rectangular (or substantially rectangular) shape when seen front-on before the non-adhesive region 21 is filled with a filler is formed as a container-forming sheet material 18.

Accordingly, the container-forming sheet material 18 that is used to form the sheet material container 10 according to the present embodiment and is formed by using a sheet material 20 including a plurality of film layers 20a, 20b, and 20c can be produced using a production method including the steps of: forming a web of the sheet material 20 in which a non-adhesive region 21 is formed at least in a bottom surface sheet 12b (in the present embodiment, a pair of body portion sheets 12a and 12a, and a bottom surface sheet 12b); bonding together peripheral edge portions that correspond to an individual container-forming sheet material 18 in the web; and cutting the bonded web to predetermined dimensions to obtain an individual container-forming sheet material 18.

In the produced container-forming sheet material 18, a non-adhesive region 21 is provided between the plurality of film layers 20a, 20b, and 20c that constitute the sheet material 20, and as a result of the non-adhesive region 21 being filled with a filler, filler-filled portions 16a, 16b, and 16f preferably having any type of inflated shape, or a rib shape are formed by the non-adhesive region 21. In this way, a sheet material container 10 according to the present embodiment is produced.

Accordingly, the sheet material container 10 according to the present embodiment can be produced using a production method including the steps of: forming a web of the sheet material 20 in which a non-adhesive region 21 is provided at least in a bottom surface sheet 12b (in the present embodiment, a pair of body portion sheets 12a and 12a, and a bottom surface sheet 12b); bonding together peripheral edge portions that correspond to an individual sheet material container 10 in the web; cutting the bonded web to predetermined dimensions; and filling the non-adhesive region 21 with a filler so as to form a reinforcing bottom filler-filled portion 16b (in the present embodiment, a front filler-filled portion 16a, a bottom filler-filled portion 16b, and a connection portion filler-filled portion 16f).

In the present embodiment, the sheet material container 10 that has the above-described configuration is transported to, for example, a product manufacturing plant, as a container-forming sheet material 18 that is folded flat as shown in FIG. 5 before the non-adhesive region 21 is filled with a filler. Accordingly, a large number of container-forming sheet materials 18 before being filled with a content material such as a content liquid can be efficiently transported in a state where the container-forming sheet materials 18 are less bulky and have a smaller transport volume. In the product manufacturing plant, by performing a production method including the steps of: containing a content material in a containing portion of the sheet material container 10; and filling the non-adhesive region 21 with a filler so as to form a reinforcing bottom filler-filled portion 16b (in the present embodiment, a front filler-filled portion 16a, a bottom filler-filled portion 16b, and a connection portion filler-filled portion 16f), a bag-like container product 11 can be easily produced.

In order to produce a container product 11, for example, a transported container-forming sheet material 18 is unfolded from the flat folded state, and the non-adhesive region 21 is filled with a filler via the external communication opening 22 so as to form filler-filled portions 16a, 16b, and 16f preferably having any type of inflated shape, or a rib shape, thereby forming a three-dimensional sheet material container 10 that has the bottom surface gusset portion sheet 13b as the bottom portion. After that, a liquid detergent that is a content liquid is injected into the containing portion 12 through a portion of the upper portion of a pair of front sheets 13a and 13a that was not heat sealed and was left unsealed as an injection opening. Furthermore, after the liquid detergent has been injected into the containing portion, the injection opening is bonded preferably using heat sealing, and an extension portion of the seal-bonding piece 23 that extends upward from the external communication opening 22 is cut and removed where necessary. In this way, a container product 11 as shown in FIG. 1 that contains the liquid detergent in the sheet material container 10 is productized, the container product 11 being capable of standing by itself when the placement portion 17 formed in the bottom surface sheet 12b (see FIG. 3) is placed on a placement surface.

With the container product 11, it is also possible to, after a liquid detergent has been injected into the container-forming sheet material 18 via the injection opening, fill the non-adhesive region 21 with a filler via the external communication opening 22 so as to form filler-filled portions 16, thereby producing a sheet material container 10, and productizing a container product 11. It is also possible to, concurrently with the injection of a liquid detergent into the container-forming sheet material 18 via the injection opening, fill the non-adhesive region 21 with a filler via the external communication opening 22 so as to form filler-filled portions 16, thereby producing a sheet material container 10, and productizing a container product 11. Also, as described above, after the sheet material container 10 has been produced by forming the filler-filled portions 16 through filling the non-adhesive region 21 with a filler via the external communication opening 22, a liquid detergent may be injected into the sheet material container 10 via the injection opening. The operation of filling the sheet material container 10 with a content liquid can thereby be performed in a stable state.

In the container product 11 formed by using the sheet material container 10 according to the present embodiment, in the body portion sheets 12a provided with the containing portion that contains the content liquid therebetween, or in other words, in each of the pair of front and back body portion sheets 12a and 12a of the body portion 12, a reinforcing front filler-filled portion 16a that preferably has a rib shape is provided so as to extend in an elongated linear shape. Likewise, in the bottom surface sheet 12b that constitutes the containing portion 12 as well, a reinforcing bottom filler-filled portion 16b that preferably has an inflated shape, for example, a rib shape is provided so as to extend in an elongated linear shape (see FIG. 3). The front filler-filled portions 16a provided in the body portion sheets 12a and 12a and the bottom filler-filled portion 16b provided in the bottom surface sheet 12b are in communication with each other via the connection portion filler-filled portion 16f provided in the bonding portion 14 in the bottom portion of the sheet material container 10.

Here, the filler-filled portions 16a, 16b, and 16f extending in an elongated linear shape are filled portions that have a width of, for example, about 3 to 50 mm and are provided continuously. The filler-filled portions 16a, 16b, and 16f may also include, other than filled portions extending continuously in a linear shape, filled portions that extend continuously in any other type of elongated shape such as a curved shape, a corrugated shape, or a crank shape. Also, where necessary, in an arbitrary portion of the linear filler-filled portions 16a, 16b, and 16f, for example, a filler-filled portion 24 that has a planar shape that is wider than the width of the linear portions of the filler-filled portions 16a, 16b, and 16f, a circular shape that is wide and is raised in a dome shape, or a spherical shape may be provided individually or in combination as appropriate (see FIG. 13). The sheet material container 10 forms a three-dimensional shape when a filler is filled and the filler-filled portions 16a, 16b, and 16f are inflated, or when a content material is sufficiently contained. In the sheet material container 10 that forms a three-dimensional shape, it is preferable to provide an inflated region formed by the filler-filled portion 16a in a region corresponding to a corner portion of a cross section of the body portion sheets 12a and 12a. From the viewpoint of drop strength and shape retaining properties, it is preferable that a corner portion of the cross section of the body portion sheets 12a and 12a is formed by a ridge line rising from the bottom portion side of the body portion sheets 12a and 12a or a curved corner portion, and a filler-filled portion 16a is formed in a region corresponding to the ridge line or the corner portion.

In the present embodiment, as shown in FIGS. 2(a) and 2(b), the reinforcing front filler-filled portion 16a provided in each of the pair of front and back body portion sheets 12a and 12a includes two horizontal filled portions 16c that extend in the horizontal direction and are provided in parallel and spaced apart from each other, five vertical filled portions 16d that extend in the vertical direction and are provided in parallel and spaced apart from each other, and a bottom curved filled portion 16e that is provided so as to extend in a curved shape along the bottom portion of the body portion sheet 12a or 12a. The filled portions 16c, 16d, and 16e are in communication with each other. Among the five vertical filled portions 16d, three vertical filled portions 16d between a pair of vertical filled portions 16d on two sides are provided such that their lower end portions are not continuous (not in communication) with the bottom curved filled portion 16e, and are spaced apart from the bottom curved filled portion 16e. As a result of having a spaced-apart portion, the self-standing stability is further improved because, when produced as a container product, the spaced-apart portion bends under the weight of the content material, and the bottom surface of the container product can more easily expand.

Also, in one of the pair of front and back body portion sheets 12a and 12a that will be used as the front side, a communication port connection filled portion 16i is formed so as to extend upward from, for example, the upper end portion of the second rightmost vertical filled portion 16d. An overlapping portion between the upper portion of the communication port connection filled portion 16i and the bonding portion 14 at the upper portion of the front sheet 13a is the external communication opening 22. As described above, the external communication opening 22 is sealed preferably using heat sealing after a fluid such as air or water has been injected into the non-adhesive region 21 as the filler so as to inflate the filler-filled portions 16a, 16b, and 16f, and thus the filler-filled portions 16a, 16b, and 16f can be easily filled with the fluid. The external communication opening 22 may be sealed using a method other than heat sealing, such as, for example, using an adhesive agent or a non-return valve, or by folding the external communication opening 22.

Here, because the reinforcing front filler-filled portion 16a provided in each of the body portion sheets 12a and 12a includes the horizontal filled portions 16c that are formed so as to extend in the horizontal direction, the strength and rigidity against a horizontal load applied to the container product 11 can be effectively enhanced, and the grip properties of the body portion 12 can be improved. Also, because the vertical filled portions 16d that are formed so as to extend in the vertical direction are included, the strength and rigidity against a vertical load applied to the container product 11 can be effectively enhanced, and the grip properties of the body portion 12 can be improved. Because the reinforcing front filler-filled portions 16a include the horizontal filled portions 16c that are formed so as to extend in the horizontal direction and the vertical filled portions 16d that are formed so as to extend in the vertical direction, a synergistic effect created by these filled portions allows the strength and rigidity against a load applied to the container product 11 to be more effectively enhanced, and the grip properties of the body portion 12 can be further improved. Also, because the external communication opening 22 that is sealed preferably through heat sealing after a fluid has been injected into the non-adhesive region 21 is provided in the overlapping portion between the upper portion of the front sheet 13a and with the bonding portion 14, in the production line of the container product 11, the external communication opening 22 can be easily sealed to contain a filler.

In the present embodiment, as described above, the containing portion includes the bottom surface sheet 12b. The bottom surface sheet 12b is unfolded and forms the placement portion 17 as shown in FIG. 3 when, in a state in which the bottom surface sheet 12b is folded flat via the folding crease line 13c, a content material is contained in the containing portion, or the non-adhesive region 21 is filled with a filler to form the bottom filler-filled portion 16b. Also, a non-adhesive region 21 is provided between the plurality of film layers 20a, 20b, and 20c that constitute the sheet material 20 that constitutes the bottom surface sheet 12b (see FIG. 4) such that the bottom filler-filled portion 16b is formed by the non-adhesive region 21 when the non-adhesive region 21 is filled with a filler.

That is, in the present embodiment, in the bottom surface sheet 12b that constitutes the bottom portion 25 of the containing portion, as the reinforcing bottom filler-filled portion 16b, a filler-filled portion is provided that includes three intersecting filled portions 16g, and a pair of communication rib portions 16h. The intersecting filled portions 16g are disposed to substantially perpendicularly intersect the folding crease line 13c on the bottom surface gusset portion sheet 13b configured to be folded inward of the bottom portion between the pair of front sheets 13a and 13a so as to have an M-shaped cross section. The communication rib portions 16h are disposed so as to allow both end portions of the three intersecting rib portions 16g to be in communication with each other.

Because the bottom filler-filled portion 16b is provided in the bottom surface sheet 12b, the strength and rigidity of the bottom surface sheet 12b can be effectively enhanced. Also, because the intersecting filled portions 16g of the bottom filler-filled portion 16b are disposed to substantially perpendicularly intersect the crease line 13c on the bottom surface gusset portion sheet 13b, as a result of the intersecting filled portions 16g being inflated, it is possible to smoothly guide the bottom surface sheet 12b formed by the folded bottom surface gusset portion sheet 13b to expand against the fold line. Furthermore, for example, when the non-adhesive region 21 is filled with a filler to form the bottom filler-filled portion 16*b*, the bottom surface sheet 12*b* unfolds, and thus the placement portion 17 formed in the bottom surface sheet 12*b* can be placed on a placement surface by using, as the leg portion, the relatively large rectangular bottom filler-filled portion 16*b* formed by the three intersecting filled portions 16*g* and a pair of communication rib portions 16*h*. With this configuration, it is possible to stabilize the shape of a portion where the bottom surface sheet 12*b* is in contact with the placement surface, and allow the bag-like container product 11 to stand by itself in a more stable manner (see FIG. 1).

According to the present embodiment, it is possible to improve the degree of freedom in the shape, the position, and the like of the reinforcing filler-filled portions 16*a*, 16*b*, and 16*f*, and provide the reinforcing filler-filled portions 16*a*, 16*b*, and 16*f* at desired positions in the container 10, and thus in particular, the bottom surface sheet 12*b* can be effectively reinforced by the bottom filler-filled portion 16*b*, the self-standing stability of the placement portion 17 can be improved, and the rigidity of the placement portion 17 can be enhanced.

Also, according to the present embodiment, the non-adhesive region 21 is provided between the plurality of film layers 20*a*, 20*b*, and 20*c* that constitute the sheet material 20, and as a result of the non-adhesive region 21 being filled with a fluid such as, for example, air or water as the filler, as shown in FIGS. 1 to 3, the reinforcing filler-filled portions 16*a*, 16*b*, and 16*f* formed by the non-adhesive region 21 inflated by being filled with the filler can be easily provided between the plurality of film layers 20*a*, 20*b*, and 20*c* of the sheet material 20. Accordingly, for example, by freely designing the shape and arrangement of the application pattern for the laminate adhesive agent that bonds the plurality of film layers 20*a*, 20*b*, and 20*c*, the non-adhesive region 21 can be easily provided in a desired shape and arrangement not only in the bonding portion 14, but also in each of the body portion sheets 12*a* and 12*a* and the bottom surface sheet 12*b* that constitute the containing portion that is particularly likely to deform. By filling the non-adhesive regions 21 with a filler so as to form filler-filled portions 16*a*, 16*b*, and 16*f* in a desired shape and arrangement, it is possible to efficiently reinforce desired portions of the sheet material container 10 and the container product 11, and improve rigidity.

FIGS. 6(*a*) and 6(*b*) show a sheet material container 60 and a container product 61 according to another embodiment of the present invention. The sheet material container 60 and the container product 61 shown in FIGS. 6(*a*) and 6(*b*) have the same configuration as the sheet material container 10 and the container product 11 according to the embodiment described above, except that the shape and arrangement of a bottom filler-filled portion 66*b* and an external communication opening 62 are different from the shape and arrangement of the bottom filler-filled portion 16*b* and the external communication opening 22 of the embodiment described above.

In the sheet material containers and the container products shown in FIGS. 6(*a*) to 12, which will be described later, bottom filler-filled portions 66*b*, 76*b*, 86*b*, and 96*b* each include a portion that is continuous from the front side to the back side of the body portion 12, and preferably include a filler non-filled portion that is not filled with a filler and is surrounded by a non-adhesive region that forms the bottom filler-filled portion 66*b*, 76*b*, 86*b*, or 96*b*. In particular, in each sheet material container 70, 89, 90 shown in FIG. 7(*a*), FIG. 8(*a*), FIG. 9(*a*), an adhesive region where the plurality of film layers are bonded is provided at the center of the bottom surface sheet 12*b*, and a non-adhesive region 79, 89, or 99*b* is provided so as to surround the adhesive region at the center. More preferably, each of the bottom filler-filled portions 66*b*, 76*b*, 86*b*, and 96*b* is formed so as to extend along the peripheral edge of the placement portion (placement region) that is to be placed on a placement surface, and even more preferably, formed so as to extend continuously along the peripheral edge. By forming the bottom filler-filled portions 66*b*, 76*b*, 86*b*, and 96*b* in the manner described above, it is possible to further enhance the rigidity of the bottom portion, and improve the self-standing stability obtained by the bottom portion and three-dimensional shape retaining properties.

Also, in the sheet material containers and the container products shown in FIGS. 6(*a*) to 12, the bottom filler-filled portions 66*b*, 76*b*, 86*b*, and 96*b* are each preferably provided in a boundary region between the body portion sheet and the bottom surface sheet. That is, the boundary region between the body portion sheet and the bottom surface sheet corresponds to a corner portion of the sheet material container. As a result of the filler-filled portion 66*b*, 76*b*, 86*b*, or 96*b* being provided in a corner portion, the leg portion of the sheet material container is formed by the filler-filled portion 66*b*, 76*b*, 86*b*, or 96*b*, and it is therefore possible to further improve drop strength, and self-standing stability.

Here, the boundary region between the front body portion sheet 12*a* and the bottom surface sheet 12*b* is not necessarily a bonding portion formed through heat sealing. The front sheet 12*a* and the bottom surface sheet 12 are not necessarily separate films, and may be a single film. By folding the single film to form a bag shape, it is possible to form a containing portion without forming a bonding portion formed through heat sealing.

In the sheet material container 60 and the container product 61 shown in FIGS. 6(*a*) and 6(*b*), as shown in FIG. 6(*c*) that shows a flat-out front view of a container-forming sheet material 68 that is used to form the sheet material container 60, a bottom filler-filled portion 66*b* that is formed as a result of a non-adhesive region 69 being filled with a filler includes three intersecting filled portions 66*g*, and a pair of communication rib portions 66*h*. The three intersecting filled portions 66*g* are provided in a bottom surface sheet 62*b* so as to substantially perpendicularly intersect a folding crease line 63*c* provided on a bottom surface gusset portion sheet 63*b* and to be parallel to each other. Also, the pair of communication rib portions 66*h* that allow both end portions of the three intersecting filled portions 66*g* to be in communication with each other are provided in a bonding portion 64 formed by bonding bottom portions on both side edges of a pair of front and back front portion sheets 63*a* and 63*a* to both side edges of the bottom surface gusset portion sheet 63*b* through, for example, heat sealing. Furthermore, an external communication opening 62 is provided so as to extend from one of the intersecting filled portions 66*g* of the bottom filler-filled portion 66*b* along one side of the crease line 63*c* on the bottom surface gusset portion sheet 63*b*, and protrude outward from a lateral side portion of the bottom surface gusset portion sheet 63*b*.

In the sheet material container 60 and the container product 61 shown in FIGS. 6(*a*) and 6(*b*) as well, for example, when the non-adhesive region 69 is filled with a filler to form the bottom filler-filled portion 66*b*, or when a content material is contained in the containing portion, the bottom surface sheet 62*b* unfolds, and thus a placement portion 67 formed in the bottom surface sheet 62*b* can be placed on a placement surface by using the relatively large rectangular frame shaped bottom filler-filled portion 66b as the leg portion. Accordingly, it is possible to obtain the same advantageous effects as those of the sheet material container 10 and the container product 11 according to the embodiment described above.

Figure 6A:
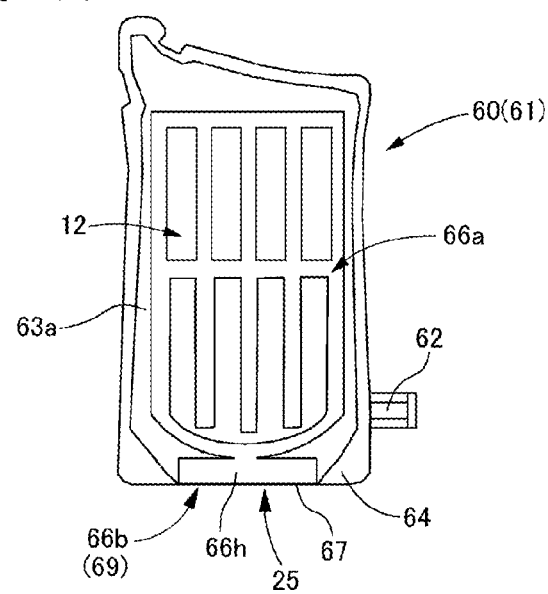
FIG. 6(a) is a schematic front view of a container product that uses a sheet material container according to another embodiment.

Also, in the sheet material container 60 and the container product 61 shown in FIGS. 6(a) and 6(b), the communication rib portions 66h of the bottom surface filler-filled portion 66b are provided over quite a long length along the bonding portion 64 formed by bonding the bottom portions of the pair of front portion sheets 63a and 63a to opposing peripheral edge portions of the bottom surface gusset portion sheet 63b. With this configuration, by placing the communication rib portions 66h on both sides directly onto a placement surface, even when the sheet material container 60 is empty such as before a content liquid is contained in the containing portion, the container can be stably placed on the placement surface in a self-standing manner. Furthermore, the external communication opening 62 is provided so as to extend from the bottom filler-filled portion 66b, and the communication rib portions 66h of the bottom filler-filled portion 66b are provided over quite a long length along the bonding portion 64 formed by bonding the bottom portions of the pair of front portion sheets 63a and 63a to both peripheral edge portions of the bottom surface gusset portion sheet 63b. With this configuration, by using the communication rib portions 66h as a connection portion for connecting the bottom filler-filled portion 66b and a front filler-filled portion 66a, a filler can be smoothly distributed and contained throughout the bottom filler-filled portion 66b and the front filler-filled portion 66a, with small pressure loss and a simple filler filling step.

FIG. 7(a) also shows a sheet material container 70 and a container product 71 according to another embodiment of the present invention. The sheet material container 70 and the container product 71 shown in FIG. 7(a) also have the same configuration as the sheet material container 10 and the container product 11 according to the embodiment described above, except that the shape and arrangement of a bottom filler-filled portion 76b and an external communication opening 72 are different from the shape and arrangement of the bottom filler-filled portion 16b and the external communication opening 22 according to the embodiment described above.

To be specific, in the sheet material container 70 and the container product 71 shown in FIG. 7(a), as shown in FIG. 7(b) that shows a flat-out front view of a container-forming sheet material 78 that is used to form the sheet material container 70, a bottom filler-filled portion 76b that is formed as a result of a non-adhesive region 79 being filled with a filler is formed so as to have a rectangular frame shape that includes a pair of intersecting filled portions 76g and a pair of communication rib portions 76h. The pair of intersecting filled portions 76g are disposed in a bottom surface sheet 72b to substantially perpendicularly intersect a crease line 73c provided on a bottom surface gusset portion sheet 73b and to be parallel to each other. Also, the pair of communication rib portions 76h that allow both end portions of the intersecting filled portions 76g to be in communication with each other are provided in a bonding portion 74 formed by bonding bottom portions on both side edges of a pair of front and back front portion sheets 73a and 73a to both side edges of the bottom surface gusset portion sheet 73b through, for example, heat sealing. Furthermore, an external communication opening 72 is provided so as to extend from one of the intersecting filled portions 76g of the bottom filler-filled portion 76b along one side of the crease line 73c on the bottom surface gusset portion sheet 73b, and protrude outward from a lateral side portion of the bottom surface gusset portion sheet 73b.

Even with the sheet material container 70 and the container product 71 shown in FIG. 7(a), for example, when the non-adhesive region 79 is filled with a filler to form the bottom filler-filled portion 76b, or when a content material is contained in the containing portion, the bottom surface sheet 72b unfolds, and thus a placement portion 77 formed in the bottom surface sheet 72b can be placed on a placement surface by using the relatively large rectangular frame shaped bottom filler-filled portion 76b as the leg portion. Accordingly, it is possible to obtain the same advantageous effects as those of the sheet material container 10 and the container product 11 according to the embodiment described above.

Also, with the sheet material container 70 and the container product 71 shown in FIG. 7(a), the communication rib portions 76h of the bottom filler-filled portion 76b are provided over quite a long length along the bonding portion 74 formed by bonding the bottom portions on both side edges of the pair of front portion sheets 73a and 73a to both side edges of the bottom surface gusset portion sheet 73b, and it is therefore possible to obtain the same advantageous effects as those of the sheet material container 60 and the container product 61 according to the embodiment described above. Furthermore, the bottom filler-filled portion 76b has a rectangular frame shape that includes the pair of intersecting filled portions 76g, and the pair of communication rib portions 76h, and thus when the non-adhesive region 79 is filled with a filler, and the bottom filler-filled portion 76b is formed, the bottom surface sheet portion 72b can be easily spread open, and even greater rigidity can be imparted to the leg portion of the placement portion 77 by the bottom filler-filled portion 76b.

FIG. 8(a) also shows a sheet material container 80 and a container product 81 according to another embodiment of the present invention. The sheet material container 80 and the container product 81 shown in FIG. 8(a) also have the same configuration as the sheet material container 10 and the container product 11 according to the embodiment described above, except that the shape and arrangement of a bottom filler-filled portion 86b and an external communication opening 82 are different from the shape and arrangement of the bottom filler-filled portion 16b and the external communication opening 22 according to the embodiment described above.

To be specific, in the sheet material container 80 and the container product 81 shown in FIG. 8(a), as shown in FIG. 8(b) that shows a flat-out front view of a container-forming sheet material 88 that is used to form the sheet material container 80, a bottom filler-filled portion 86b that is formed as a result of a non-adhesive region 89 being filled with a filler is formed so as to have a rectangular planar filled portion 86k that has a non-filled portion 86j at the center and is provided continuously to extend across a pair of bonding portions 84 on opposing sides formed by bonding the bottom portions of a pair of front and back front portion sheets 83a and 83a to the periphery of a bottom surface gusset portion sheet 83b. The planar filled portion 86k has the circular non-filled portion 86j at the center. Also, an external communication opening 82 is provided so as to extend from one of the lateral side portions of the rectangular planar filled portion 86k along one side of the crease line 83c on the bottom surface gusset portion sheet 83b, and protrude outward from a lateral side portion of the bottom surface gusset portion sheet 83b. The non-filled portion 86j at the center is preferably an adhesive portion where a plurality of film layers are bonded.

Even with the sheet material container 80 and the container product 81 shown in FIG. 8(a), for example, when the non-adhesive region 89 is filled with a filler to form the bottom filler-filled portion 86b, or when a content material is contained in the containing portion, a bottom surface sheet 82b unfolds, and a placement portion 87 formed in the bottom surface sheet 82b can be placed on a placement surface by using, the relatively large rectangular planar filled portion 86k as the leg portion, and it is therefore possible to obtain the same advantageous effects as those of the sheet material container 10 and the container product 11 according to the embodiment described above.

Also, with the sheet material container 80 and the container product 81 shown in FIG. 8(a), opposing edge portions of the rectangular planar filled portion 86k are provided over quite a long length along bonding portions 84 between the bottom portion of the pair of front portion sheets 83a and 83a and opposing peripheries of the bottom surface gusset portion sheet 83b, and it is therefore possible to obtain the same advantageous effects as those of the sheet material container 60 and the container product 61 according to the embodiment described above. Furthermore, the bottom filler-filled portion 86b is formed to include the rectangular planar filled portion 86k that is provided continuously so as to extend across the pair of opposing bonding portions 84, and it is therefore possible to improve self-standing stability when the bottom filler-filled portion 86b is placed on a placement surface by using the placement portion 87 as the leg portion.

FIG. 9(a) also shows a sheet material container 90 and a container product 91 according to another embodiment of the present invention. The sheet material container 90 and the container product 91 shown in FIG. 9(a) also have the same configuration as the sheet material container 10 and the container product 11 according to the embodiment described above, except that the shape and arrangement of a bottom filler-filled portion 96b and an external communication opening 92 are different from the shape and arrangement of the bottom filler-filled portion 16b and the external communication opening 22 according to the embodiment described above.

To be specific, in the sheet material container 90 and the container product 91 shown in FIG. 9(a), as shown in FIG. 9(b) that shows a flat-out front view of a container-forming sheet material 98 that is used to form the sheet material container 90, a bottom filler-filled portion 96b that is formed as a result of a non-adhesive region 99 being filled with a filler is formed so as to have a rectangular planar filled portion 96k that has a non-filled portion 96j at the center and is provided continuously to extend across a pair of bonding portions 94 on opposing sides formed by bonding the bottom portions of a pair of front and back front portion sheets 93a and 93a to the peripheral edge portions of a bottom surface gusset portion sheet 93b. The planar filled portion 96k has a rhombic non-filled portion 96j at the center. The rhombic non-filled portion 96j is provided such that its corner portions are oriented toward middle portions spaced apart from four rectangular corner portions of four side portions of the rectangular planar filled portion 96k. Also, an external communication opening 92 is provided so as to extend from one of the lateral side portions of the rectangular planar filled portion 96k along one side of the crease line 93c on the bottom surface gusset portion sheet 93b, and protrude outward from a lateral side portion of the bottom surface gusset portion sheet 93b.

Even with the sheet material container 90 and the container product 91 shown in FIG. 9(a), for example, when the non-adhesive region 99 is filled with a filler to form the bottom filler-filled portion 96b, or when a content material is contained in the containing portion, a bottom surface sheet portion 92b unfolds, and thus a placement portion 97 formed in the bottom surface sheet portion 92b can be placed on a placement surface by using the relatively large rectangular planar filled portion 96k as the leg portion. Accordingly, it is possible to obtain the same advantageous effects as those of the sheet material container 10 and the container product 11 according to the embodiment described above.

Also, with the sheet material container 90 and the container product 91 shown in FIG. 9(a), the edge portions on opposing sides of the rectangular planar filled portion 96k are provided over quite a long length along bonding portions 94 formed by bonding the bottom portions of the pair of front portion sheets 93a and 93a to opposing peripheries of the bottom surface gusset portion sheet 93b, and it is therefore possible to obtain the same advantageous effects as those of the sheet material container 60 and the container product 61 according to the embodiment described above. Furthermore, the bottom filler-filled portion 96b is formed so as to have the rectangular planar filled portion 96k that is provided continuously to extend across the pair of bonding portions 94 on opposing sides, and it is therefore possible to, by using the bottom filler-filled portion 96b as the leg portion, improve the self-standing stability when the placement portion 97 is placed on a placement surface.

Furthermore, with the sheet material container 90 and the container product 91 shown in FIG. 9(a), the non-filled portion 96j provided at the center of the rectangular planar filled portion 96k preferably has a rhombic shape, and is provided such that its corner portions are oriented toward the middle portions spaced apart from four corner portions of four side portions of the rectangular planar filled portion 96k. With this configuration, when the bottom filler-filled portion 96b is formed by filling the non-adhesive region 99 with a filler, in the planar filled portion 96k, in the middle portions spaced apart from four rectangular corner portions, crimped portions (wrinkles) 96l are formed that are concavely bent and extend from the corner portions of the non-filled portion 96j toward four sides of the rectangular shape. Because the crimped portions (wrinkles) 96l that are concavely bent are formed in the middle portions that are spaced apart from four corner portions of the planar filled portion 96k, the portions of the planar filled portion 96k on opposing sides in the crimped portions 96l bulge downward as convex portions (protruding leg portions). Accordingly, it is possible to enable the sheet material container 90 or the container product 91 to stand by itself in a more stable manner by placing the placement portion 97 on a placement surface by using the bulged convex portions on opposing sides of the crimped portions (wrinkles) 96l as protruding leg portions 96m. That is, the non-filled portion 96j functions as a leg forming portion 100 acting as a guide such that wrinkles are formed in the planar filled portion 96k.

Figure 10:
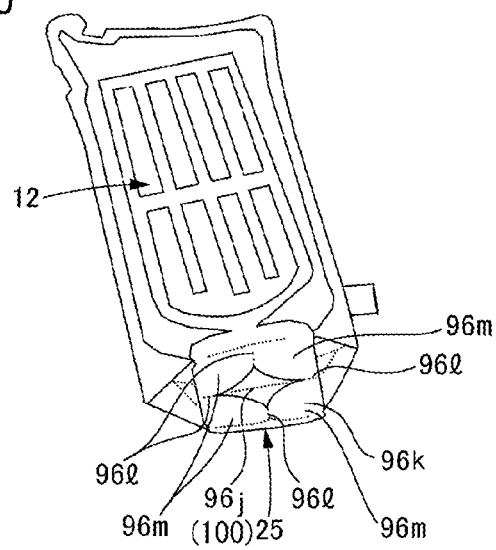
FIG. 10 is a schematic perspective view of a container product that uses a sheet material container according to another embodiment, as viewed from the bottom surface side.
Figure 11:
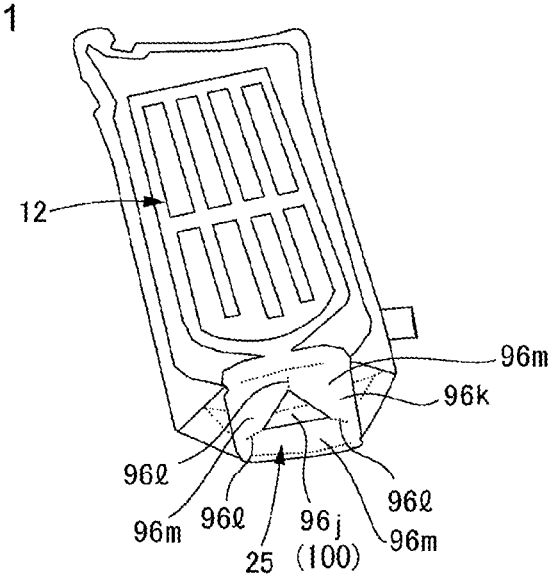
FIG. 11 is a schematic perspective view of a container product that uses a sheet material container according to another embodiment, as viewed from the bottom surface side.
Figure 12:
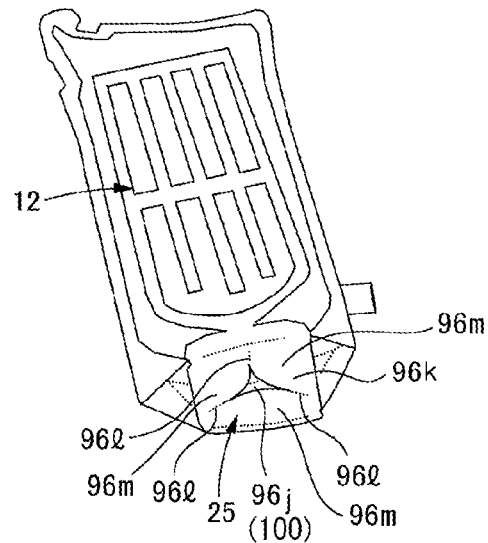
FIG. 12 is a schematic perspective view of a container product that uses a sheet material container according to another embodiment, as viewed from the bottom surface side.

The non-filled portion 96j that functions as the leg forming portion 100 and is provided such that its corner portions are oriented toward the middle portions of four side portions of the planar filled portion 96k for forming the protruding leg portions 96m by forming crimped portions (wrinkles) 96l that are concavely bent in the middle portions spaced apart from four corner portions of the rectangular planar filled portion 96k as described above does not necessarily have a rhombic shape. For example, as shown in FIG. 10, the non-filled portion 96j that functions as the leg forming portion 100 may have a substantially rhombic shape whose four sides are concavely curved toward the inside. Also, for example, as shown in FIG. 11, the non-filled portion 96j that functions as the leg forming portion 100 may have a triangular shape that is provided such that its corner portions are oriented toward the middle portions of three out of four sides of the rectangular planar filled portion 96k. Alternatively, for example, as shown in FIG. 12, the non-filled portion 96j may have a substantially triangular shape whose three sides are concavely curved inward.

That is, the sheet material container 90 shown in FIG. 9(a) is a container being made of a sheet material 20 and including a body portion 12 and a bottom portion 25 that is to be disposed on a placement surface, and the sheet material 20 including a plurality of film layers 20a, 20b, and 20c (see FIG. 4(a)). A body portion sheet 93a that constitutes the body portion 12 includes bonding portions 94 where peripheral edge portions of the sheet materials are bonded, and in a bottom surface sheet 93b that constitutes the bottom portion 25, a non-adhesive region 99 is provided between the plurality of film layers 20a, 20b, and 20c. The non-adhesive region 99 is filled with a filler so as to form a bottom filler-filled portion 96b. The bottom filler-filled portion 96b forms a placement portion 97 that extends annularly around the non-filled portion 96j of the bottom surface sheet 93 and includes at least three (in the present embodiment, four) protruding leg portions 96m that are to be placed on the placement surface and allow the container 10 to stand by itself. The protruding leg portions 96m protrude toward the placement surface from a portion (crimped portion) of the bottom filler-filled portion 96b due to the non-filled portion 96j functioning as the leg forming portion 100 of the placement portion 97.

Because the placement portion 97 that is to be placed on a placement surface includes at least three protruding leg portions 96m, it is possible to further improve the self-standing stability when the sheet material container 90 is placed on a placement surface.

Here, the leg forming portion 100 that forms at least three protruding leg portions 96m in the placement portion 97 is a portion that has a means for forming, in the bottom filler-filled portion 96b, at least three protruding leg portions 96m that preferably come into point contact with the placement surface by making the bottom surface portion of the bottom filler-filled portion 96b that extends annularly around the non-filled portion 96j uneven. As described above, the leg forming portion 100 may be, other than a wrinkle guiding portion that acts as a guide such that a plurality of wrinkles 96l are formed in the bottom filler-filled portion 96b, a convex portion or concave portion itself provided by performing unevening processing on the bottom filler-filled portion 96b, which will be described later.

Also, the filler-filled portion 96b that extends annularly around the non-filled portion 96j of the bottom surface sheet 93 is not necessarily formed by the continuously annular non-adhesive region 99 as a whole, and may include, for example, a C-shaped region as viewed from above in a part of which film layers are bonded.

Figure 16A:
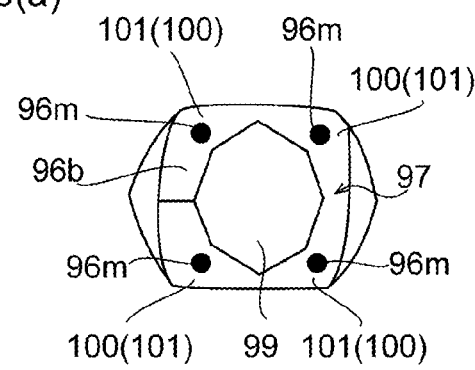
FIG. 16(a) is a bottom view of a sheet material container that shows a leg forming portion according to another embodiment.
Figure 16B:
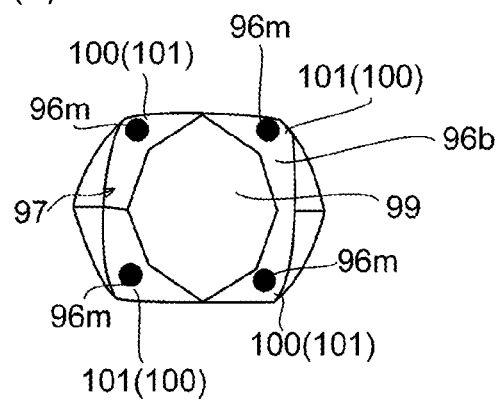
FIG. 16(b) is a bottom view of a sheet material container that shows a leg forming portion according to another embodiment.

In the present embodiment, as shown in FIGS. 16(a) and 16(b), the leg forming portion 100 that forms at least three protruding leg portions 96m in the placement portion 97 may include widened portions 101 that each have, as viewed from the bottom surface, a width in a direction perpendicular to the extension direction larger than other portions in the non-adhesive region 99. The widened portions 101 that have a large width in a state in which the non-adhesive region 99 is filled with a filler bulge so as to have a larger cross-sectional area than the other portions in the bottom filler-filled portion 96b, and thus protrude toward the placement surface past the other portions in the bottom filler-filled portion 96b that extend annularly around the non-filled portion 96j, and form the protruding leg portions 96m. Because the self-standing stability is improved when the protruding leg portions 96m formed by the widened portions 101 are, in the placement portion 97, positioned outward as much as possible (in the direction of the outer edge of the bottom portion) as viewed from the bottom surface, it is preferable that the bottom filler-filled portion 96b has a shape in which the widened portions 101 are formed such that the protruding leg portions 96m are positioned outward as much as possible (see FIG. 16(b)).

FIGS. 17 to 20 show leg forming portions 100 according to other embodiments that form at least three protruding leg portions 103 in a placement portion 102. Each plan view of bottom surface sheets 104 shown in FIGS. 17 to 20 is an enlarged view of a bottom surface sheet 104 of a container-forming sheet material 105 that is used to form a sheet material container in the flat-out front view shown in FIG. 17(c).

Figure 17A:
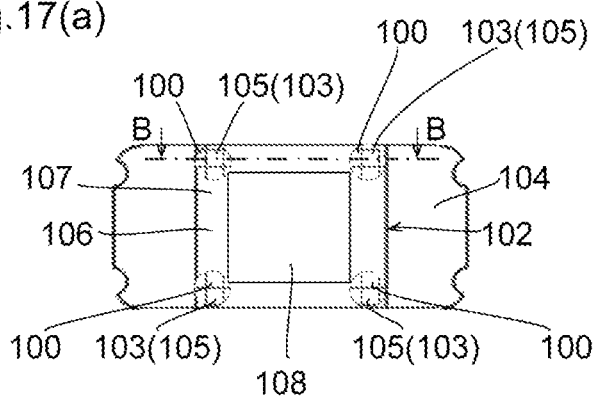
FIG. 17(a) is a plan view of a bottom surface sheet that shows a leg forming portion according to another embodiment.
Figure 17B:
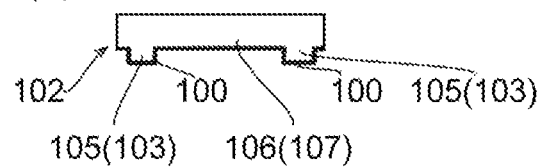
FIG. 17(b) is a schematic cross-sectional view taken along the line B-B in FIG. 17(a).
Figure 17C:
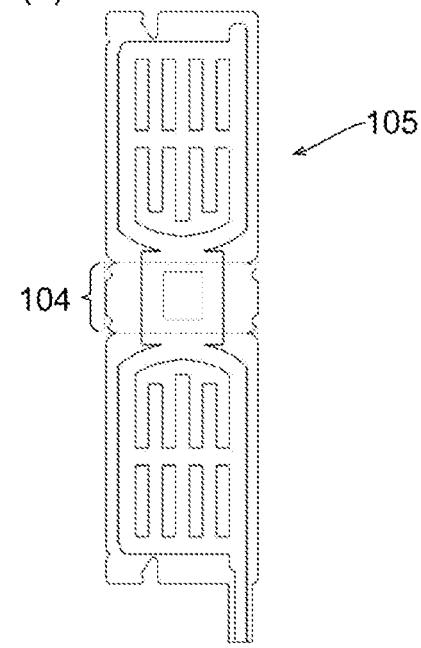
FIG. 17(c) is a plan view of a bottom surface sheet that shows a leg forming portion according to another embodiment.

In the embodiment shown in FIG. 17(a), the leg forming portions 100 for forming protruding leg portions 103 in the placement portion 102 include, as also shown in the cross-sectional view in FIG. 17(b), portions (projecting portion) 105 that are caused to project from the inside of the container to the outside, in a non-adhesive region 106. In a state in which the non-adhesive region 106 is filled with a filler, the projecting portions 105 protrude toward the placement surface with respect to other portions of a bottom filler-filled portion 107 that extends in a rectangular annular shape so as to surround a non-filled portion 108, and form four protruding leg portions 103 on the corner portions of the bottom filler-filled portion 107. The projecting portions 105 can be easily formed in a bottom surface sheet 104 using a sheet molding process such as, for example, heat embossing, pressure molding, or vacuum molding.

Figure 17D:
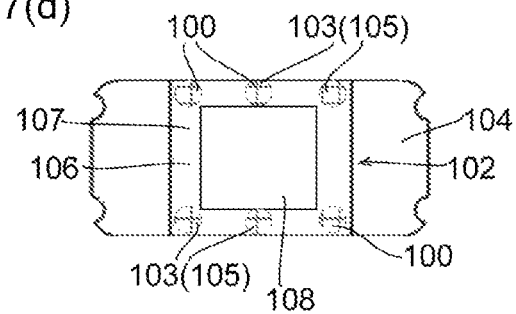
FIG. 17(d) is a plan view of a bottom surface sheet that shows a leg forming portion according to another embodiment.
Figure 17E:
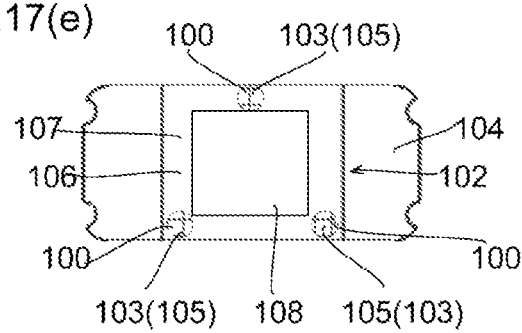
FIG. 17(e) is a plan view of a bottom surface sheet that shows a leg forming portion according to another embodiment.
Figure 17F:
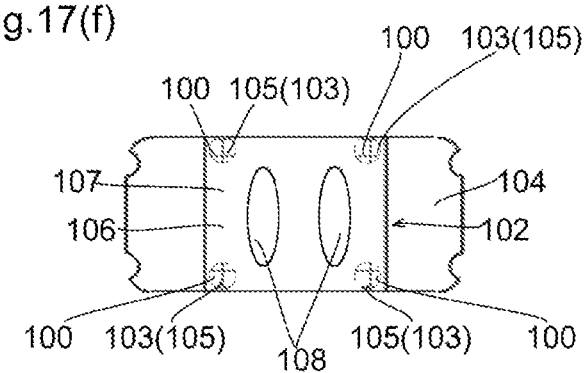
FIG. 17(f) is a plan view of a bottom surface sheet that shows a leg forming portion according to another embodiment.

As shown in FIG. 17(d), it is possible to provide four or more (six in FIG. 17(d)) protruding leg portions 103 that are formed by the projecting portions 105 in the placement portion 102 that is formed by the bottom filler-filled portion 107 that extends annularly around the non-filled portion 108, and only three protruding leg portions 103 may be provided as shown in FIG. 17(e). The placement portion 102 that is formed by the bottom filler-filled portion 107 that extends annularly does not necessarily extend annularly around one non-filled portion 108, and may extend annularly around two or more non-filled portions 108 as shown in FIG. 17(f).

Figure 18A:
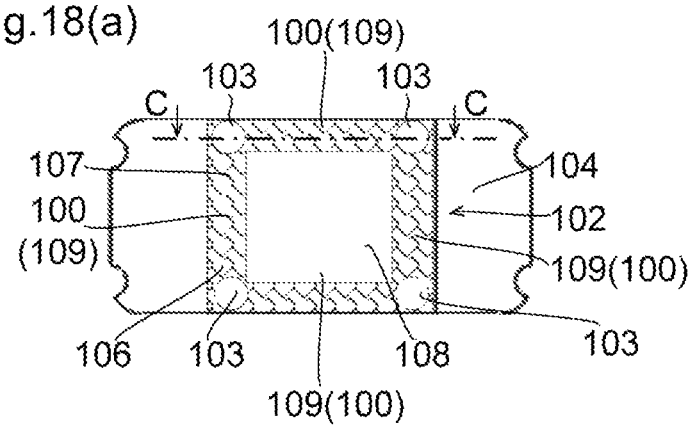
FIG. 18(a) is a plan view of a bottom surface sheet that shows a leg forming portion according to another embodiment.
Figure 18B:
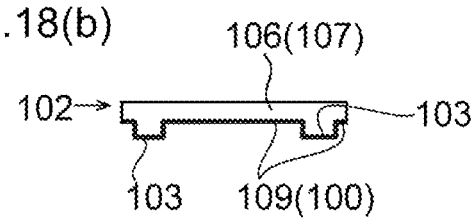
FIG. 18(b) is a schematic cross-sectional view taken along the line C-C in FIG. 18(a).

In the embodiment shown in FIG. 18(a), the leg forming portions 100 that form protruding leg portions 103 in the placement portion 102 include, as shown in the cross-sectional view in FIG. 18(b), portions (recessed portions) 109 that are recessed from the outside of the container toward the inside, in the non-adhesive region 106. In a state in which the non-adhesive region 106 is filled with a filler, the recessed portions 109 are inhibited from bulging outward, and the other portions in the bottom filler-filled portion 107 protrude toward the placement surface, thereby forming four protruding leg portions 103. The protruding leg portions 103 are provided at four corner portions of the bottom filler-filled portion 107 that extends in a rectangular annular shape so as to surround the non-filled portion 108. The recessed portions 109 can be easily provided in the bottom surface sheet 104 using a sheet molding process such as, for example, heat embossing, pressure molding, or vacuum molding.

Figure 18C:
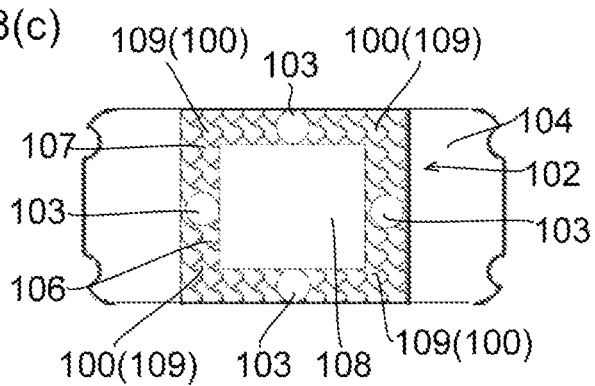
FIG. 18(c) is a plan view of a bottom surface sheet that shows a leg forming portion according to another embodiment.
Figure 18D:
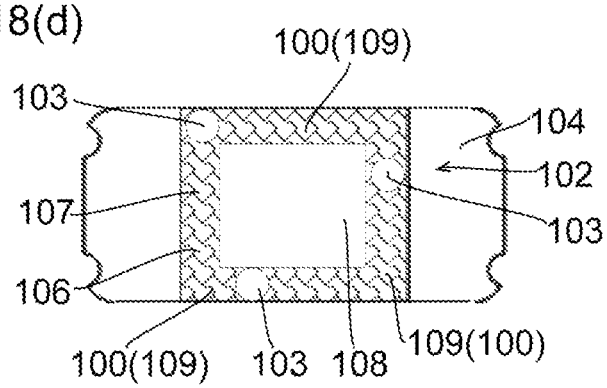
FIG. 18(d) is a plan view of a bottom surface sheet that shows a leg forming portion according to another embodiment.
Figure 18E:
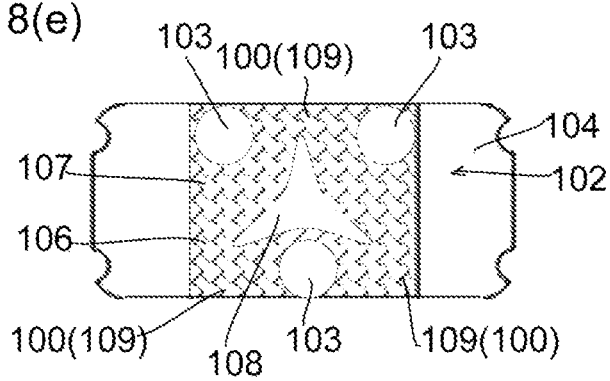
FIG. 18(e) is a plan view of a bottom surface sheet that shows a leg forming portion according to another embodiment.

As shown in FIG. 18(c), a protruding leg portion 103 formed by a leg forming portion 100 formed by a recessed portion 109 may be provided at four locations by providing a protruding leg portion at the center of each side of the placement portion 102 that is formed by the bottom filler-filled portion 107 that extends in a rectangular annular shape so as to surround the non-filled portion 108, or may be provided at three locations as shown in FIG. 18(d). As shown in FIG. 18(e), in the case where the non-adhesive region 106 and the bottom filler-filled portion 107 are provided in a region larger than the non-filled portion 108, the protruding leg portion 103 may be provided in three locations over a well-balanced region in relation to the bottom filler-filled portion 107 that is the larger region.

Figure 19A:
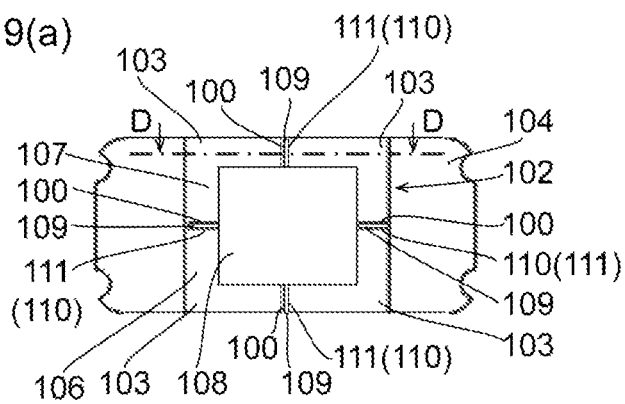
FIG. 19(a) is a plan view of a bottom surface sheet that shows a leg forming portion according to another embodiment.
Figure 19B:
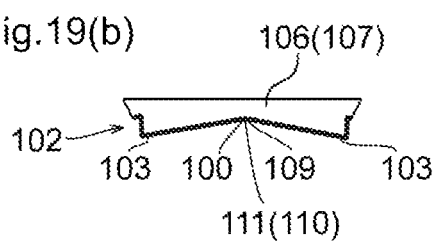
FIG. 19(b) is a schematic cross-sectional view taken along the line D-D in FIG. 19(a).

In the embodiment shown in FIG. 19(a), a leg forming portion 100 that forms a protruding leg portion 103 in the placement portion 102 includes, as also shown in the cross-sectional view in FIG. 19(b), a wrinkle guiding portion 110 that acts as a guide such that a plurality of wrinkles 109 are formed in the bottom filler-filled portion 107. A portion between a pair of adjacent wrinkles 109 formed in a state in which the non-adhesive region 106 is filled with a filler protrudes further downward than portions corresponding to the wrinkles 109, thereby forming protruding leg portions 103. In the embodiment shown in FIG. 19(a), the wrinkle guiding portion 110 comprises four linear recess groove processed portions 111 that are provided in the non-adhesive region 106. The four linear recess groove processed portions 111 are provided such that four wrinkles 109 can be formed, each being provided at the center of each side of the placement portion 102 that is formed by the bottom filler-filled portion 107 that extends in a rectangular annular shape so as to surround the non-filled portion 108. The linear recess groove processed portions 111 can be easily provided in the bottom surface sheet 104 using a sheet molding process such as, for example, heat embossing, pressure molding, or vacuum molding. In a state in which the non-adhesive region 106 is filled with a filler, each wrinkle guiding portion 110 formed by a linear recess groove processed portion 111 bends upward when stress is concentrated on the linear recess groove processed portion 110, and thereby forms a wrinkle 109 (see FIG. 19(b)), and a portion between each pair of wrinkles 109 protrudes further downward than the wrinkles 109, thus forming a protruding leg portion 103.

Figure 19C:
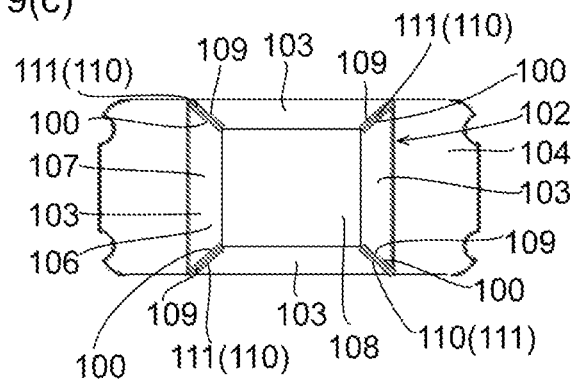
FIG. 19(c) is a plan view of a bottom surface sheet that shows a leg forming portion according to another embodiment.
Figure 19D:
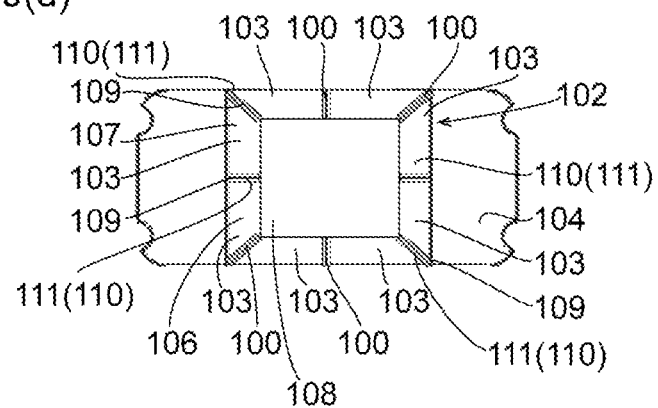
FIG. 19(d) is a plan view of a bottom surface sheet that shows a leg forming portion according to another embodiment.
Figure 19E:
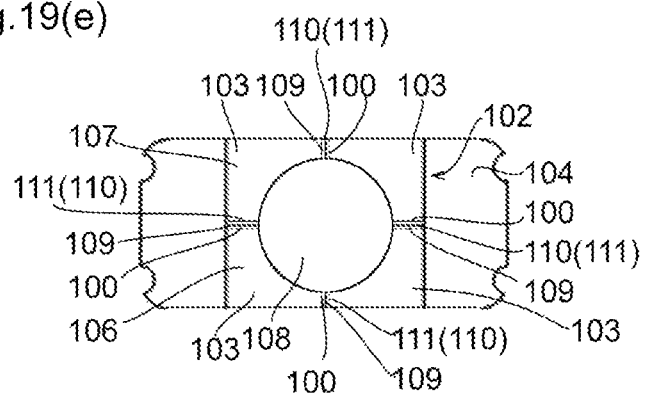
FIG. 19(e) is a plan view of a bottom surface sheet that shows a leg forming portion according to another embodiment.

As shown in FIG. 19(c), a wrinkle guiding portion 110 formed by a linear recess groove processed portion 111 may be provided at four corner portions of the non-adhesive region 106 such that wrinkles 109 are formed at four corner portions of the bottom filler-filled portion 107 that extends in a rectangular annular shape so as to surround the non-filled portion 108. It is also possible to provide the wrinkle guiding portion 110 in a total of eight locations: four corner portions and at the center of four sides as shown in FIG. 19(d). The placement portion 102 that is formed by the bottom filler-filled portion 107 that extends annularly and where wrinkles 109 are formed does not necessarily extend so as to surround the rectangular non-filled portion 108, and may extend so as to surround a circular non-filled portion 108 as shown in FIG. 19(e).

Figure 20A:
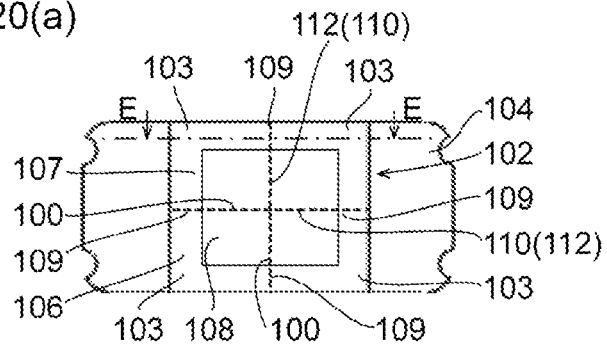
FIG. 20(a) is a plan view of a bottom surface sheet that shows a leg forming portion according to another embodiment.
Figure 20B:
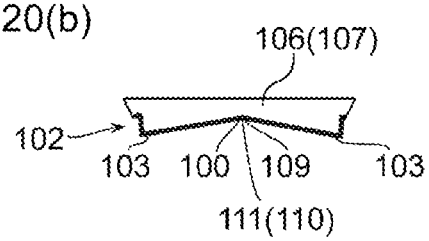
FIG. 20(b) is a schematic cross-sectional view taken along the line E-E in FIG. 20(a).

In the embodiment shown in FIG. 20(a), a leg forming portion 100 that forms a protruding leg portion 103 in the placement portion 102 includes, as also shown in the cross-sectional view in FIG. 20(b), wrinkle guiding portions 110 that act as guides such that a plurality of wrinkles 109 are formed in the bottom filler-filled portion 107, as in the embodiment shown in FIG. 19(a). In a state in which the non-adhesive region 106 is filled with a filler, a portion between each pair of formed adjacent wrinkles 109 protrudes further downward than portions corresponding to the wrinkles 109, thereby forming protruding leg portions 103. In the embodiment shown in FIG. 20(a), the wrinkle guiding portions 110 comprise two perpendicular ruled line processed portions 112 that extend linearly from the non-filled portion 108 to the non-adhesive region 106. The two perpendicular ruled line processed portions 112 are provided such that four wrinkles 109 can be formed, each being provided at the center of each side of the placement portion 102 that is formed by the bottom filler-filled portion 107 that extends in a rectangular annular shape so as to surround the non-filled portion 108. The ruled line processed portions 112 can be easily provided in the bottom surface sheet 104 using, for example, ruled line processing such as pressing using a knife edge, or folding by forming crease lines. In a state in which the non-adhesive region 106 is filled with a filler, each wrinkle guiding portion 110 formed by a ruled line processed portion 112 bends upward when stress is concentrated on the ruled line processed portions 112, and thereby forms a wrinkle 109 (see FIG. 20(b)), and a portion between each pair of wrinkles 109 protrudes further downward than the wrinkles 109, forming a protruding leg portion 103.

Figure 20C:
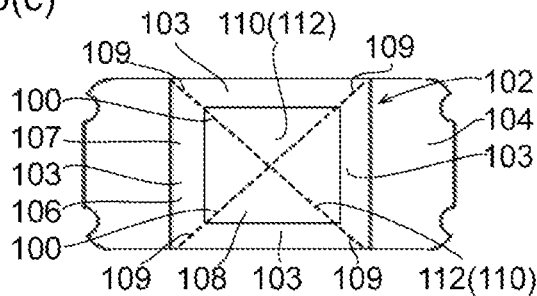
FIG. 20(c) is a plan view of a bottom surface sheet that shows a leg forming portion according to another embodiment.
Figure 20D:
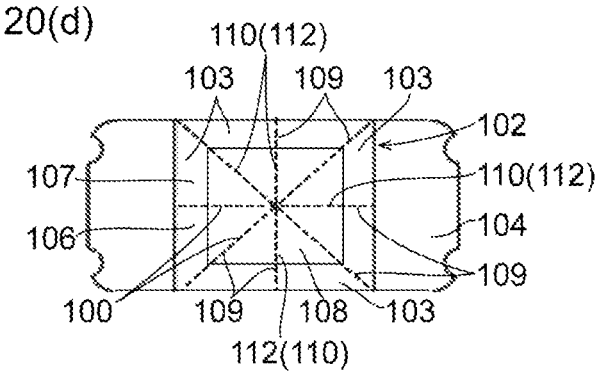
FIG. 20(d) is a plan view of a bottom surface sheet that shows a leg forming portion according to another embodiment.
Figure 20E:
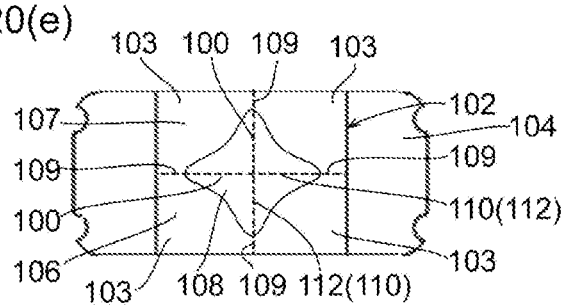
FIG. 20(e) is a plan view of a bottom surface sheet that shows a leg forming portion according to another embodiment.

With respect to the wrinkle guiding portions 110 that are formed by the ruled line processed portions 112, as shown in FIG. 20(c), it is possible to provide two wrinkle guiding portions 110 so as to extend toward the corner portions of the non-adhesive region 106 such that wrinkles 109 are formed at four corner portions of the bottom filler-filled portion 107 that extends in a rectangular annular shape so as to surround the non-filled portion 108. It is also possible to provide four wrinkle guiding portions 110 so as to extend toward the corner portions and the center of each side of the bottom filler-filled portion 107 as shown in FIG. 20(d). The placement portion 102 that is formed by the bottom filler-filled portion 107 that extends annularly and where the wrinkles 109 are formed does not necessarily extend so as to surround the rectangular non-filled portion 108, and may extend so as to surround a non-filled portion 108 of any other shape as shown in FIG. 20(e).

Figure 21A:
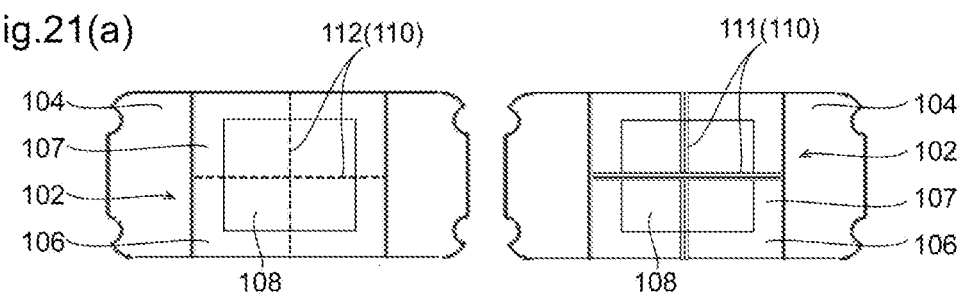
FIG. 21(a) is a plan view of a bottom surface sheet that shows a leg forming portion according to another embodiment.
Figure 21B:
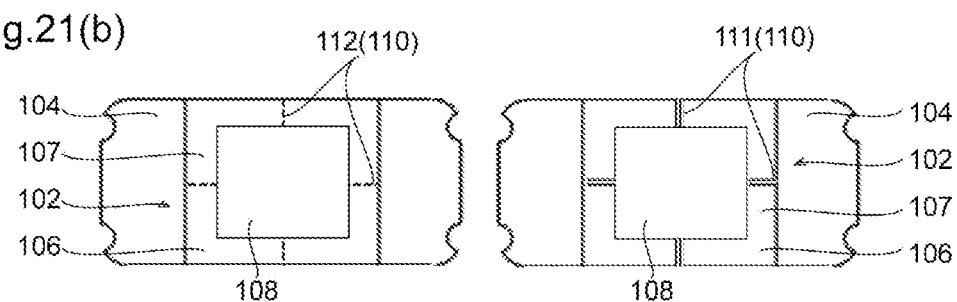
FIG. 21(b) is a plan view of a bottom surface sheet that shows a leg forming portion according to another embodiment.
Figure 21C:
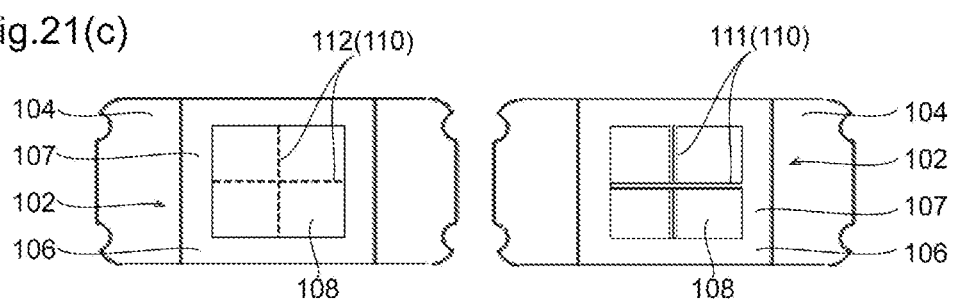
FIG. 21(c) is a plan view of a bottom surface sheet that shows a leg forming portion according to another embodiment.
Figure 21D:
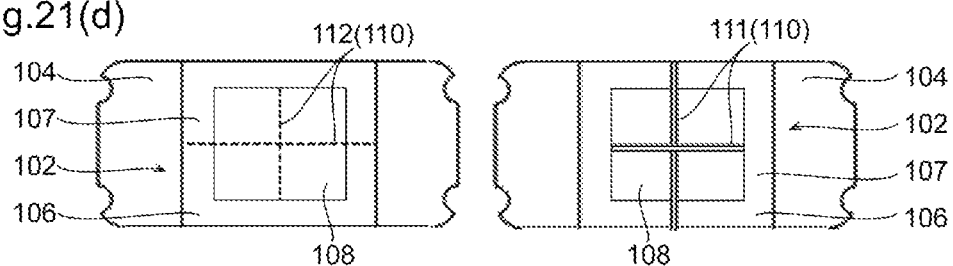
FIG. 21(d) is a plan view of a bottom surface sheet that shows a leg forming portion according to another embodiment.

The wrinkle guiding portions 110 formed by the ruled line processed portions 112, and the wrinkle guiding portions 110 formed by the linear recess groove processed portions 111 may also be provided as shown in FIG. 21(a) so as to extend continuously in both the bottom filler-filled portion 107 that is formed by the non-adhesive region 106, and the non-filled portion 108. It is also possible to provide the wrinkle guiding portions 110 formed by the ruled line processed portions 112, and the wrinkle guiding portions 110 formed by the linear recess groove processed portions 111 only in the bottom filler-filled portion 107 that is formed by the non-adhesive region 106 as shown in FIG. 21(b), or only in the non-filled portion 108 as shown in FIG. 21(c). It is also possible to, as shown in FIG. 21(d), combine the wrinkle guiding portions provided only in the non-filled portion 108 with the wrinkle guiding portions provided so as to extend continuously in both the bottom filler-filled portion 107 that is formed by the non-adhesive region 106, and the non-filled portion 108.

Figure 22A:
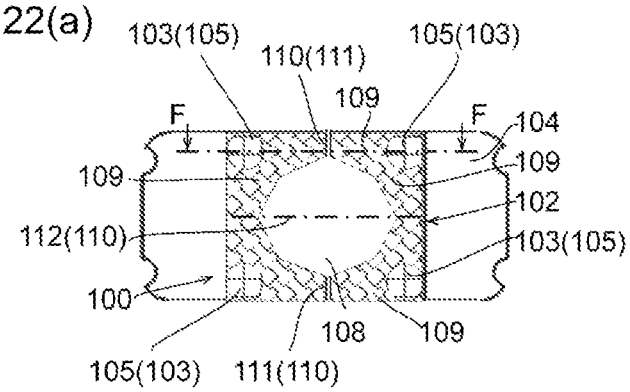
FIG. 22(a) is a plan view of a bottom surface sheet that shows a leg forming portion according to another embodiment.
Figure 22B:
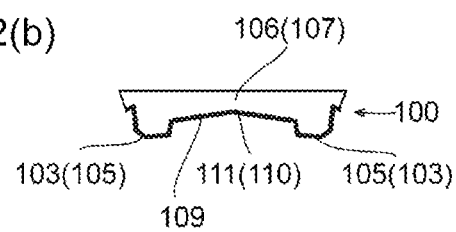
FIG. 22(b) is a schematic cross-sectional view taken along the line F-F in FIG. 22(a).
Figure 22C:
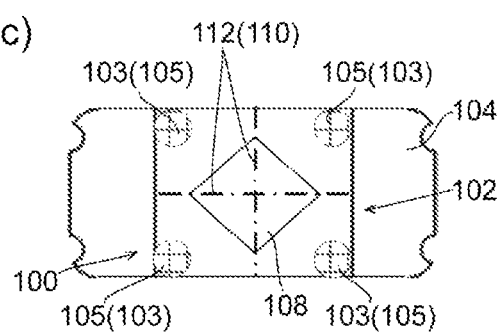
FIG. 22(c) is a plan view of a bottom surface sheet that shows a leg forming portion according to another embodiment.

Also, with respect to the leg forming portions 100, the leg forming portions 100 including the projecting portions 105 shown in FIG. 17(a), the leg forming portions 100 including the recessed portions 109 shown in FIG. 18(a), the leg forming portions 100 including the wrinkle guiding portions 110 formed by the linear recess groove processed portions 111 shown in FIG. 19(*a*), and the leg forming portions 100 including the wrinkle guiding portions 110 formed by the ruled line processed portions 112 shown in FIG. 20(*a*) may be combined as appropriate. FIGS. 22(*a*) and 22(*b*) show, as an example in which a projecting portion 105 is used as a protruding leg portion 103, a leg forming portion 100 composed of a combination of a projecting portion 105, a recessed portion 109, a wrinkle guiding portion 110 formed by a linear recess groove processed portion 111, and a wrinkle guiding portion 110 formed by a ruled line processed portion 112. FIG. 22(*c*) also shows, as an example in which a projecting portion 105 is used as a protruding leg portion 103, a leg forming portion 100 composed of a combination of a projecting portion 105 and a wrinkle guiding portion 110 formed by a ruled line processed portion 112.

In the present embodiment, as a method for providing the projecting portions 105, the recessed portions 109, the wrinkle guiding portions 110 formed by the linear recess groove processed portions 111, and the wrinkle guiding portions 110 formed by the ruled line processed portions 112 that constitute the leg forming portions 100 described above, for example, a method can be used in which, in the bottom surface sheet 104 that is made of a sheet material including a plurality of film layers, an outer film layer and an inner film layer that are disposed to have a non-adhesive region 106 therebetween are thermally bonded to each other to form the non-adhesive region 106, and thereafter the outer film layer and the inner film layer are heat embossed, ruled line processed, or folded. It is also possible to use a method in which each of the outer film layer and the inner film layer is heat embossed, ruled line processed, or folded, and thereafter the film layers are thermally bonded to form a non-adhesive region 106. Furthermore, it is also possible to use a method in which only the outer film layer is heat embossed, ruled line processed, or folded, and thereafter the outer film layer is thermally bonded to the inner film layer to form a non-adhesive region 106.

Figure 23A:
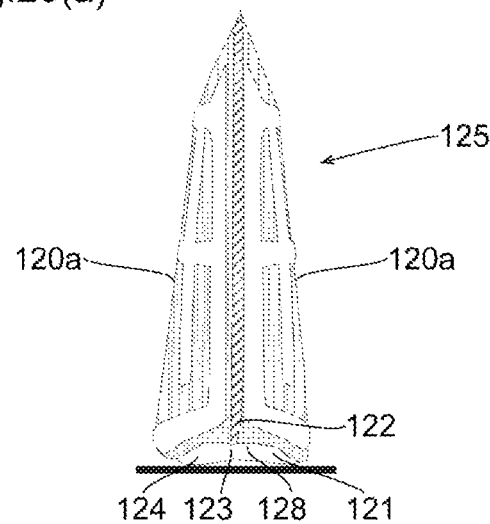
FIG. 23(a) is a side view showing a sheet material container according to another embodiment.
Figure 23B:
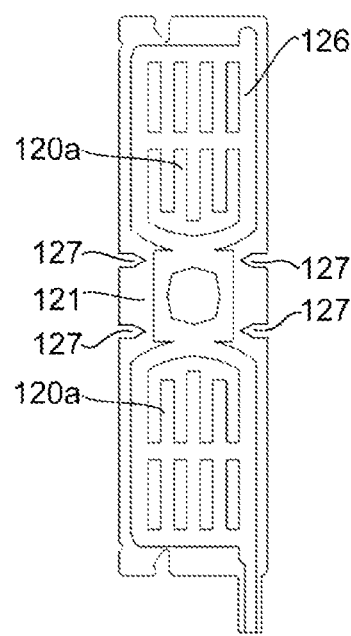
FIG. 23(b) is a flat-out front view of a container-forming sheet material that is used to form the sheet material container shown in FIG. 23(a).
Figure 23C:
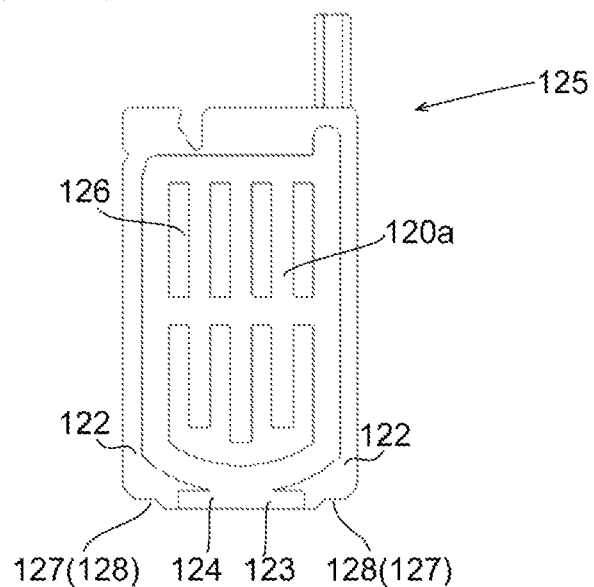
FIG. 23(c) is a schematic front view of the sheet material container shown in FIG. 23(a).

Also, in the present embodiment, as shown in FIG. 23(*a*), the lower end portion of a lower bonding portion 122 formed by bonding side edges on both sides of the lower end portions of a pair of front and back front portion sheets 120*a* and 120*a* to side edges on both sides of a bottom surface sheet 121 that is folded in half inward of the lower end portions of the front portion sheets 120*a* and 120*a* through heat sealing or the like is configured to not protrude downward past the placement portion 124 provided in the bottom surface sheet 121 formed by the bottom filler-filled portion 123. With this configuration, it is possible to further improve the self-standing stability when a sheet material container 125 is placed on a placement surface.

That is, in the embodiment shown in FIG. 23(*a*), as shown in FIG. 23(*b*) that shows a flat-out front view of a container-forming sheet material 126 that is used to form a sheet material container 125, boundary notches 127 having a relatively large width are formed in a boundary portion between the bottom surface sheet 121 and each of the front portion sheets 120*a* and 120*a* so as to extend inward from both edge portions of these sheets along the boundary portion. With this configuration, when the sheet material container 125 is formed, as shown in FIG. 23(*c*), lower end notches 128 are formed in the lower end portion of the lower bonding portion 122 formed by bonding side edges on both sides of the lower end portions of the front portion sheets 120*a* and 120*a* to side edges on both sides of the bottom surface sheet 121. Accordingly, with the lower end notches 128, as shown in FIG. 23(*a*), the lower end portion of the lower bonding portion 122 can be provided at a position higher than the placement portion 124.

Figure 24A:
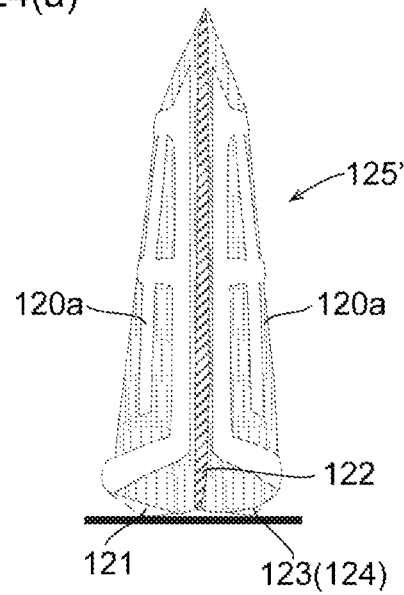
FIG. 24(a) is a side view showing a sheet material container according to another embodiment.
Figure 24B:
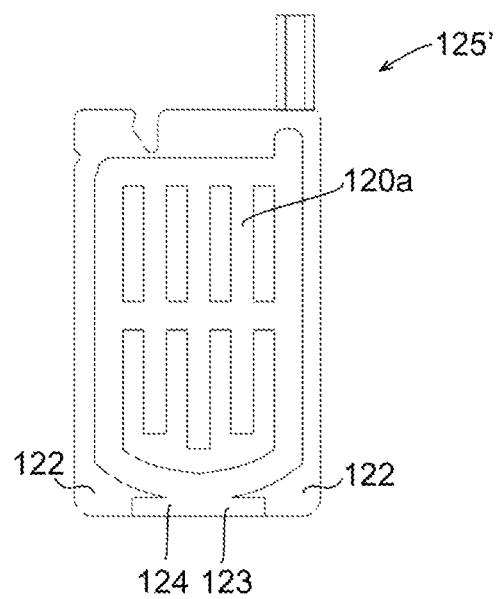
FIG. 24(b) is a schematic front view of the sheet material container shown in FIG. 24(a).

Also, with this configuration, it is effectively prevented that the lower end portion of the lower bonding protein 122 is likely to about against the placement surface so that a sheet material container 125' becomes unstable, as is the case with a configuration, as shown in FIGS. 24(*a*) and 24(*b*), in which the lower end notches are not provided in the lower bonding portion 122 formed by bonding side edges on both sides of the lower end portions of the front portion sheets 120*a* and 120*a* to side edges on both sides of the bottom surface sheet 121.

The present invention is not limited to the embodiments described above, and various modifications can be made. For example, the film layers that constitute a sheet material are not necessarily bonded using a lamination method that uses a laminate adhesive agent, and may be bonded by using any other known method. For example, it is possible to use a bonding method that uses other adhesives such as, for example, a UV curable adhesive, and an instant adhesive. The layers in which a non-adhesive region is provided are not necessarily bonded using a lamination method that uses a laminate adhesive agent, and may be bonded by using any other known method so as to have a non-adhesive region. As described above, the non-adhesive region may be provided through a non-adhesive treatment in which, for example, a glue deactivation agent is applied to the surface of each film layer. The sheet material does not necessarily include three film layers composed of an innermost layer, an intermediate layer, and an outermost layer, and may include two film layers, or four or more film layers. For example, in the case where the sheet material is composed of three film layers, the non-adhesive region is not necessarily formed between the sealant film layer of the innermost layer and the intermediate layer, and may be formed between the intermediate layer and the outermost layer.

Also, the intermediate layer may be formed to include a layer made of, for example, a polyethylene resin that is used in the barrier film layer and the sealant film layer. It is also possible to form a non-adhesive region having a desired shape between the intermediate layer and the innermost layer by using a patterned hot plate, a heat seal bar, or the like to heat seal a layer made of the resin used in the sealant film layer and a sealant film layer that is the innermost layer. In this case, depending on the content material contained in the containing portion, the intermediate layer may be a single layer made of the resin used in the sealant film layer. It is also possible to form a non-adhesive region between the intermediate layer and the innermost layer by using a linear heat seal bar to heat seal a plurality of portions of the sheet material where the layers are spaced apart from each other. The layer made of resin used in the sealant film layer may be made of a resin different from the resin that constitutes the adjacent sealant film layer. The layer made of resin used in the sealant film layer can be formed using, for example, a low density polyethylene resin (LDPE), a medium density polyethylene resin (MDPE), a high density polyethylene resin (HDPE), a linear low density polyethylene resin (L-LDPE), a polypropylene resin (PP), or the like. Also, in this specification, the term "bonding" encompasses "tacky adhesion" as described above, and also encompasses "heat sealing". Also, the content material contained in the containing portion may be, other than a content material such as a liquid detergent, any other content material such as a powder, or a food product, a pharmaceutical, or the like.

Figure 13:
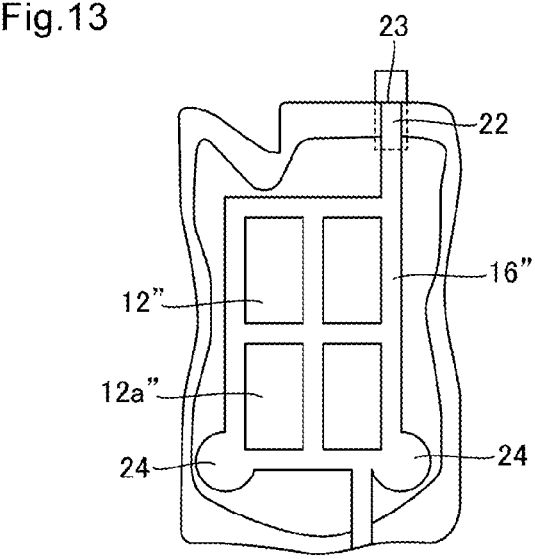
FIG. 13 is a front view of a sheet material container according to another embodiment.

Also, the shape of the filler-filled portion formed as a result of the non-adhesive region being filled with a filler is not limited to those of the embodiments described above, and the filler-filled portion may be formed to have any pattern shape according to the type and application of the container. The filler-filled portion is not necessarily formed in both the body portion sheet and the bottom surface sheet of the containing portion, and it is sufficient that the bottom filler-filled portion is provided only in the bottom surface sheet. Also, in each of the body portion sheet and the bottom surface sheet, an external communication opening may be provided. The filler-filled portion does not necessarily extend linearly as a whole, and for example, as shown in FIG. 13, in an arbitrary position on a linear filler-filled portion 16", for example, in a bottom corner portion of a body portion sheet 12a" of a body portion 12", a planar filler-filled portion 24 with a circular shape (including a substantially circular shape) and an increased width may be provided. By providing the planar filler-filled portion 24 in a bottom corner portion of the body portion sheet 12a" that may break when dropped, the drop strength of the sheet material container can be improved as per a cushioning effect produced by the filler-filled portion 24. The filler-filled portion formed as a result of the non-adhesive region being filled with a filler may be formed simultaneously when the content material is contained, or may be formed in advance before the content material is contained, or may be formed after the content material is contained.

Figure 14:
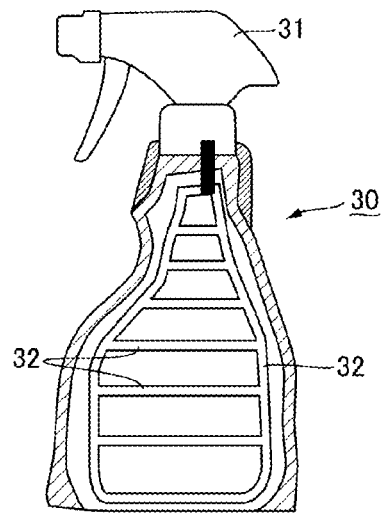
FIG. 14 is a front view of a sheet material container according to another embodiment.
Figure 15:
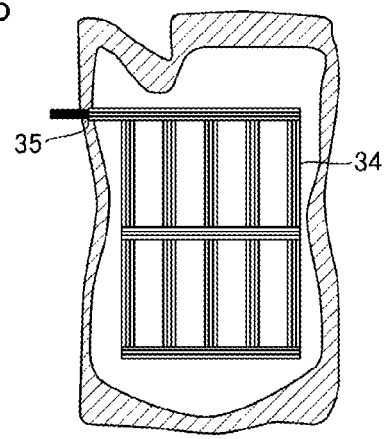
FIG. 15 is a front view of a sheet material container according to another embodiment.

Furthermore, for example, as shown in FIG. 14, a sheet material container 30 may be used as a bottle-shaped container equipped with a triggered dispensing apparatus 31. When the sheet material container 30 is used as a bottle-shaped container, a reinforcing filler-filled portion 32 can effectively reinforce the container such that the bottle shape is stably retained. Also, for example, as shown in FIG. 15, an external communication opening 35 that is in communication with a reinforcing filler-filled portion 34 may be provided to open in the horizontal direction.

Furthermore, the sheet material container according to the present invention may be a gusset type sheet material container that includes side hem portions. That is, the body portion sheet that constitutes a sheet material container may include a front sheet, a back sheet, and a pair of side sheets between the front sheet and the back sheet.

With respect to the embodiments described above, the present invention further discloses the following sheet material container, sheet material container production method, container product, container product production method, container-forming sheet material, and production method for producing a container-forming sheet material.

<1> A sheet material container being made of a sheet material and comprising a body portion and a bottom portion that is to be disposed on a placement surface, and the sheet material including a plurality of film layers,
wherein a body portion sheet that constitutes the body portion includes a bonding portion where peripheral edge portions of the sheet materials are bonded,
in a bottom surface sheet constituting the bottom portion, a non-adhesive region is provided in the plurality of film layers, and
the non-adhesive region forms a bottom filler-filled portion when it is filled with a filler.

<2> The sheet material container as set forth in clause <1>,
wherein preferably, the bottom surface sheet constituting the bottom portion forms a placement portion (bottom portion) that is to be placed on a placement surface to allow the container to stand by itself.

<3> The sheet material container as set forth in clause <1> or <2>,
wherein preferably, the bottom filler-filled portion includes a portion that intersects a folding crease line provided on the bottom surface sheet.

<4> The sheet material container as set forth in any one of clauses <1> to <3>,
wherein preferably, the bottom filler-filled portion includes a portion that is continuous from a front side to a back side of the body portion.

<5> The sheet material container as set forth in any one of clauses <1> to <4>,
wherein preferably, the bottom surface sheet includes a non-filled portion that is not filled with a filler and is surrounded by the non-adhesive region that forms the bottom filler-filled portion.

<6> The sheet material container as set forth in any one of clauses <2> to <5>,
wherein preferably, the bottom filler-filled portion is formed so as to extend continuously along a peripheral edge of the placement portion (bottom portion) in the bottom surface sheet.

<7> The sheet material container as set forth in any one of clauses <1> to <6>,
wherein preferably, the body portion sheet includes a pair of opposing front sheets, and in the front sheets, a front filler-filled portion is formed as a result of a non-adhesive region that is provided between the plurality of film layers being filled with a filler, the non-adhesive region constituting the front filler-filled portion is in communication with a non-adhesive region that forms the bottom filler-filled portion in the bottom surface sheet.

<8> The sheet material container as set forth in clause <7>,
wherein preferably, the front filler-filled portion is formed to include a linearly extending portion.

<9> The sheet material container as set forth in any one of clauses <1> to <8>,
wherein preferably, the plurality of film layers in which the non-adhesive region is provided are bonded using an adhesive agent, and the non-adhesive region is formed by using an application pattern that includes the non-adhesive region to apply the adhesive agent.

<10> The sheet material container as set forth in any one of clauses <1> to <8>,
wherein preferably, the plurality of film layers in which the non-adhesive region is provided are bonded using an adhesive agent, and the non-adhesive region is formed by performing non-adhesive treatment on a surface of at least one film layer that corresponds to a portion of the non-adhesive region.

<11> The sheet material container as set forth in any one of clauses <1> to <10>,
wherein preferably, a peripheral edge portion of the bottom surface sheet includes a bonding portion where the sheet materials are bonded, an external communication opening that is open in the bottom surface sheet or the peripheral edge portion of the bottom surface sheet and that is in communication with the non-adhesive region is provided, and the external communication opening is sealed after a filler is supplied to the non-adhesive region.

<12> A production method for producing the sheet material container as set forth in any one of clauses <1> to <10>, the method including the steps of: forming a web of the sheet material in which the non-adhesive region is provided in the bottom surface sheet portion;
  bonding together a peripheral edge portion of a portion of the sheet material corresponding to an individual sheet material container in the web;
  cutting the bonded web to predetermined dimensions; and
  filling the non-adhesive region with a filler to form the bottom filler-filled portion.
<13> A container product that uses the sheet material container as set forth in any one of clauses <1> to <11>,
  wherein a content material is contained in a containing portion that is surrounded by the body portion and the bottom portion.
<14> A container-forming sheet material that is used to form the sheet material container as set forth in any one of clauses <1> to <11> and is formed by using a sheet material in which a plurality of film layers are stacked, the container-forming sheet material including:
  a body portion sheet;
  a bonding portion between the sheet materials that is formed in a peripheral edge portion of the body portion sheet; and
  a bottom surface sheet,
  wherein the bottom surface sheet includes a folding crease line, and is folded flat via the folding crease line, and
  in the bottom surface sheet, a non-adhesive region that is to be filled with a filler is provided in the plurality of film layers.
<15> A production method for producing the container product as set forth in clause <13>, the method including the step of containing the content material in the containing portion that is surrounded by the body portion and the bottom portion of the sheet material container.
<16> A production method for producing the container-forming sheet material as set forth in clause <14>, the method including the steps of:
  forming a web of the sheet material in which the non-adhesive region is provided in the bottom surface sheet;
  bonding together a peripheral edge portion of a portion corresponding to an individual container-forming sheet material in the web; and
  cutting the bonded web to predetermined dimensions.
<17> The sheet material container as set forth in any one of clauses <1> to <11>,
  wherein the filler is preferably any one of a fluid, a powder, a resin, and a foam, or a mixture of at least two selected therefrom as appropriate.
<18> The sheet material container as set forth in any one of clauses <1> to <11>,
  wherein preferably, a film layer in which the non-adhesive region is provided includes a layer made of a resin used in a sealant film layer, and the film layer and the sealant film layer adjacent to the film layer are bonded using heat sealing.
<19> The sheet material container as set forth in any one of clauses <1> to <11>,
  wherein preferably, the body portion sheet includes a pair of front and back front sheets, and in the front sheets, a front filler-filled portion is formed as a result of a non-adhesive region that is provided between the plurality of film layers that constitute the sheet material being filled with a filler, and the front filler-filled portion is formed to include a horizontal filled portion, a vertical filled portion, and a bottom curved filled portion.
<20> The sheet material container as set forth in clause <19>,
  wherein the vertical filled portion comprises three or more vertical filled portions, with a vertical filled portion between a pair of vertical filled portions on both ends being provided such that its lower end portion is not continuous with the bottom curved filled portion, and is spaced apart from the bottom curved filled portion.
<21> The sheet material container as set forth in any one of clauses <7> to <11>, <19>, and <20>,
  wherein preferably, an external communication opening for supplying a filler to the non-adhesive region is provided so as to be in communication with the non-adhesive region, the external communication opening being open in a bonding portion of an upper portion of one of the pair of front and back front sheet portions, and the external communication opening is sealed after the filler is supplied to the non-adhesive region.
<22> The sheet material container as set forth in clause <11> or <21>,
  wherein preferably, in the external communication opening, one of opposing inner wall surfaces is a wall surface formed by a sealant film layer, the other inner wall surface is a wall surface formed by a barrier film layer, and a seal-bonding piece whose one inner wall surface is the sealant film layer is adhesively attached to cover the other inner wall surface formed by the barrier film layer.
<23> The sheet material container as set forth in clause <8>,
  wherein preferably, in the linear filler-filled portion, a planar filler-filled portion, a circular filler-filled portion, and a spherical filler-filled portion that have a wider width than a width of the linear filler-filled portion are provided individually or in a combination as appropriate.
<24> The sheet material container as set forth in clause <2>,
  wherein preferably, the placement portion (bottom portion) is formed as a result of the bottom filler-filled portion being formed and the bottom surface sheet being unfolded.
<25> The sheet material container as set forth in clause <24>,
  wherein preferably, the bottom filler-filled portion includes an intersecting filled portion that is provided to substantially perpendicularly intersect a folding crease line formed on the bottom surface sheet.
<26> The sheet material container as set forth in clause <25>,
  wherein preferably, the bottom filler-filled portion is formed to have a rectangular frame shape that includes a pair of the intersecting filled portions 76g and a pair of communication rib portions.
<27> The sheet material container as set forth in clause <24>,
  wherein preferably, the bottom filler-filled portion is formed to include a rectangular planar filled portion that is provided continuously so as to extend across a pair of opposing bonding portions formed by bonding bottom portions of a pair of front and back front portion sheets to a peripheral edge portion of a bottom surface gusset portion sheet, and that has a non-filled portion at a center.

<28> The sheet material container as set forth in clause <27>,
wherein preferably, the non-filled portion is a circular non-filled portion.

<29> The sheet material container as set forth in clause <27>,
wherein preferably, the non-filled portion is provided such that corner portions thereof are oriented toward middle portions spaced apart from four rectangular corner portions of four side portions of the rectangular planar filled portion.

<30> The sheet material container as set forth in clause <29>,
wherein preferably, the non-filled portion is a rhombic non-filled portion.

<31> The sheet material container as set forth in clause <29>,
wherein preferably, the non-filled portion is a triangular non-filled portion.

<32> A sheet material container being made of a sheet material and including a body portion and a bottom portion that is to be disposed on a placement surface, and the sheet material including a plurality of film layers,
wherein a body portion sheet that constitutes the body portion includes a bonding portion where peripheral edge portions of the sheet materials are bonded, and
in a boundary between a bottom surface sheet constituting the bottom portion and the body portion sheet, a non-adhesive region is provided in the plurality of film layers, and the non-adhesive region forms a bottom filler-filled portion when it is filled with a filler.

<33> A sheet material container being made of a sheet material and including a body portion and a bottom portion that is to be disposed on a placement surface, and the sheet material including a plurality of film layers,
wherein a body portion sheet that constitutes the body portion includes a bonding portion where peripheral edge portions of the sheet materials are bonded,
the body portion sheet includes a pair of front surfaces and a pair of side surfaces, each being disposed between the front surfaces,
the bonding portion is located in an area of the pair of side surfaces, and
in a boundary between one of the front surfaces and one of the side surfaces, a non-adhesive region is provided in the plurality of film layers, and a front filler-filled portion is formed when the adhesive region is filled with a filler.

<34> A sheet material container being made of a sheet material and including a body portion and a bottom portion that is to be disposed on a placement surface, and the sheet material including a plurality of film layers,
wherein a body portion sheet that constitutes the body portion includes a bonding portion where peripheral edge portions of the sheet materials are bonded,
in a bottom surface sheet constituting the bottom portion, a non-adhesive region is provided in the plurality of film layers, the non-adhesive region forming a bottom filler-filled portion when it is filled with a filler, and
the bottom filler-filled portion extends annularly around a non-filled portion in the bottom surface sheet, and forms at least three protruding leg portions that are to be placed on the placement surface to allow the container to stand by itself, the protruding leg portions protruding toward the placement surface past other portions in the bottom filler-filled portion due to a leg forming portion provided in the bottom portion.

<35> The sheet material container as set forth in clause <34>,
wherein preferably, the leg forming portion includes portions that are wider than other portions in the non-adhesive region in a direction perpendicular to an extension direction, and, in a state in which the non-adhesive region is filled with a filler, the wider portions bulge so as to have a larger cross-sectional area than the other portions, and thereby protrude toward the placement surface past the other portions in the bottom filler-filled portion and form the protruding leg portions.

<36> The sheet material container as set forth in clause <34> or <35>,
wherein preferably, the leg forming portion includes a projecting portion that has undergone processing to project from inside the container toward the outside of in the non-adhesive region, and, in a state in which the non-adhesive region is filled with a filler, the projecting portion protrudes toward the placement surface past the other portions in the bottom filler-filled portion, and forms the protruding leg portions.

<37> The sheet material container as set forth in clause <34> or <35>,
wherein preferably, the leg forming portion includes a recessed portion that has undergone processing to be recessed from outside of the container toward the inside in the non-adhesive region, and, in a state in which the non-adhesive region is filled with a filler, the recessed portion is inhibited from bulging outward, and the other portions in the bottom filler-filled portion protrude toward the placement surface and form the protruding leg portions.

<38> The sheet material container as set forth in any one of clauses <34> to <37>,
wherein preferably, the leg forming portion includes a wrinkle guiding portion that acts as a guide such that a plurality of wrinkles are formed in the bottom filler-filled portion, and a portion between each pair of adjacent wrinkles formed in a state in which the non-adhesive region is filled with a filler protrudes further downward than the wrinkle portions, thereby forming the protruding leg portions.

<39> The sheet material container as set forth in clause <38>,
wherein preferably, the wrinkle guiding portion is a linear recess groove processed portion and/or a ruled line processed portion provided in the non-adhesive region.

<40> A production method for producing the sheet material container as set forth in any one of clauses <34> to <39>, the method including the steps of:
forming a web of the sheet material in which the non-adhesive region is provided in the bottom surface sheet portion;

bonding together a peripheral edge portion of a portion of the sheet material corresponding to an individual sheet material container in the web;
cutting the bonded web to predetermined dimensions; and
filling the non-adhesive region with a filler to form the bottom filler-filled portion.
<41> A container product that uses the sheet material container as set forth in any one of clauses <34> to <39>,
wherein a content material is contained in a containing portion that is surrounded by the body portion and the bottom portion.
<42> A production method for producing the container product as set forth in clause <41>, the method including the step of containing the content material in the containing portion that is surrounded by the body portion and the bottom portion of the sheet material container.
<43> A container-forming sheet material that is used to form the sheet material container as set forth in any one of clauses <34> to <39> and is formed by using a sheet material in which a plurality of film layers are stacked, the container-forming sheet material including:
a body portion sheet;
a bonding portion between the sheet materials that is formed in a periphery of the body portion sheet; and
a bottom surface sheet,
wherein the bottom surface sheet includes a folding crease line, and is folded flat via the folding crease line, and
in the bottom surface sheet, a non-adhesive region that is to be filled with a filler is provided in the plurality of film layers.
<44> A production method for producing the container-forming sheet material as set forth in clause <43>, the method including the steps of:
forming a web of the sheet material in which the non-adhesive region is provided in the bottom surface sheet;
bonding together a peripheral edge portion of a portion corresponding to an individual container-forming sheet material in the web; and
cutting the bonded web to predetermined dimensions.

INDUSTRIAL APPLICABILITY

With the sheet material container according to the present invention, the production method for producing the sheet material container, the container product that uses the sheet material container, the production method for producing the container product, the container-forming sheet material used to form the sheet material container, or the production method for producing the container-forming sheet material, it is possible to improve the degree of freedom in the shape, the position, and the like of the reinforcing filler-filled portions, and provide the filler-filled portions at desired positions in the container, and thus in particular, the bottom surface sheet portion can be effectively reinforced by the filler-filled portion, the self-standing stability of the container can be improved, and the rigidity of the bottom surface sheet portion can be enhanced. Also, with the sheet material container according to the present invention, the production method for producing the sheet material container, and the container-forming sheet material used to form the sheet material container, it is possible to, by using a filler-filled portion, improve three-dimensional shape retaining properties of the container irrespective of whether the amount of content material is large or small, enhance drop strength, or improve three-dimensional shape forming properties from a container-forming sheet material. Also, with the sheet material container according to the present invention, it is possible to further improve self-standing stability when the sheet material container is placed on a placement surface.

The invention claimed is:
1. A sheet material container being made of a sheet material, the container comprising:
a body portion; and
a bottom portion that is to be disposed on a placement surface, wherein
the sheet material includes a plurality of film layers,
a body portion sheet that constitutes the body portion includes a bonding portion where peripheral edge portions of the sheet material are bonded,
in a bottom surface sheet constituting the bottom portion, a non-adhesive region is provided in the plurality of film layers,
the non-adhesive region forms a bottom filler-filled portion when the non-adhesive region is filled with a filler,
the bottom filler-filled portion includes an intersection portion that intersects a folding crease line provided on the bottom surface sheet,
the folding crease line extends between the peripheral edge portions of the sheet material,
the intersection portion extends in a front-rear direction and is disposed between a front side and a rear side of the container, and
in an entire area between the front side and the rear side of the container, a lower end of the intersection portion is at a same height as or below another bonding portion formed by the body portion sheet and the bottom surface sheet.
2. The sheet material container according to claim 1, wherein the bottom surface sheet constituting the bottom portion forms a placement portion that is to be placed on the placement surface to allow the container to stand by itself.
3. The sheet material container according to claim 1, wherein the bottom filler-filled portion includes a portion that is continuous from a front side to a back side of the body portion.
4. The sheet material container according to claim 1, wherein the bottom surface sheet includes a non-filled portion that is not filled with a filler and is surrounded by the non-adhesive region that forms the bottom filler-filled portion.
5. The sheet material container according to claim 2, wherein the bottom filler-filled portion is formed so as to extend continuously along a peripheral edge of the placement portion in the bottom surface sheet.
6. The sheet material container according to claim 1, wherein
the body portion sheet includes a pair of opposing front sheets,
in the front sheets, a front filler-filled portion is formed as a result of another non-adhesive region that is provided between the plurality of film layers being filled with the filler, and
the other non-adhesive region constituting the front filler-filled portion is in communication with the non-adhesive region that forms the bottom filler-filled portion in the bottom surface sheet.

7. The sheet material according to claim 2, wherein the placement portion is formed as a result of the bottom filler-filled portion being formed and the bottom surface sheet being unfolded.

8. The sheet material container according to claim 7, wherein the intersection portion is substantially perpendicularly to the folding crease line.

9. The sheet material container according to claim 8, wherein the bottom filler-filled portion is formed to have a rectangular frame shape that includes a pair of the intersecting filled portions and a pair of communication rib portions.

10. The sheet material container according to claim 7, wherein the bottom filler-filled portion is formed to include a rectangular planar filled portion that is provided continuously so as to extend across a pair of opposing bonding portions formed by bonding bottom portions of a pair of front and back front portion sheets to a peripheral edge portion of a bottom surface gusset portion sheet and that has a non-filled portion at a center.

11. The sheet material container according to claim 1, wherein
    the bottom filler-filled portion extends annularly around a non-filled portion in the bottom surface sheet and forms at least three protruding leg portions that are to be placed on the placement surface to allow the container to stand by itself, and
    the protruding leg portions protrude toward the placement surface past other portions in the bottom filler-filled portion due to a leg forming portion provided in the bottom portion.

12. A production method for producing the sheet material container according to claim 1, the method comprising the steps of:
    forming a web of the sheet material in which the non-adhesive region is provided in the bottom surface sheet;
    bonding together a peripheral edge portion of a portion of the sheet material corresponding to an individual sheet material container in the web;
    cutting the bonded web to predetermined dimensions; and
    filling the non-adhesive region with the filler to form the bottom filler-filled portion.

13. A container product that uses the sheet material container according to claim 1, wherein a content material is contained in a containing portion that is surrounded by the body portion and the bottom portion.

14. A container-forming sheet material that is used to form the sheet material container according to claim 1 and is formed by using the sheet material in which the plurality of film layers are stacked, the container-forming sheet material including:
    the body portion sheet;
    the bonding portion; and
    the bottom surface sheet, wherein
    the bottom surface sheet includes the folding crease line, and is folded flat via the folding crease line, and
    in the bottom surface sheet, the non-adhesive region that is to be filled with the filler is provided in the plurality of film layers.

15. A production method for producing the container product according to claim 13, the method including the step of containing the content material in the containing portion that is surrounded by the body portion and the bottom portion of the sheet material container.

16. A production method for producing the container-forming sheet material according to claim 14, the method including the steps of:
    forming a web of the sheet material in which the non-adhesive region is provided in the bottom surface sheet;
    bonding together a peripheral edge portion of a portion corresponding to an individual container-forming sheet material in the web; and
    cutting the bonded web to predetermined dimensions.

\* \* \* \* \*